US012621859B2

(12) United States Patent
Wang et al.

(10) Patent No.: US 12,621,859 B2
(45) Date of Patent: May 5, 2026

(54) USER EQUIPMENT AND METHOD FOR FRAME-BASED EQUIPMENT OPERATION IN AN UNLICENSED BAND

(71) Applicant: SHARP KABUSHIKI KAISHA, Sakai City (JP)

(72) Inventors: Hai-Han Wang, Taipei (TW); Chia-Hsin Lai, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 211 days.

(21) Appl. No.: 18/282,064

(22) PCT Filed: Apr. 7, 2022

(86) PCT No.: PCT/CN2022/085573
§ 371 (c)(1),
(2) Date: Sep. 14, 2023

(87) PCT Pub. No.: WO2022/214030
PCT Pub. Date: Oct. 13, 2022

(65) Prior Publication Data
US 2024/0306189 A1        Sep. 12, 2024

Related U.S. Application Data

(60) Provisional application No. 63/171,961, filed on Apr. 7, 2021, provisional application No. 63/171,953, filed on Apr. 7, 2021.

(51) Int. Cl.
*H04W 74/00*        (2009.01)
*H04W 72/12*        (2023.01)
(Continued)

(52) U.S. Cl.
CPC ..... *H04W 74/006* (2013.01); *H04W 72/1273* (2013.01); *H04W 72/232* (2023.01); *H04W 74/0808* (2013.01)

(58) Field of Classification Search
None
See application file for complete search history.

(56) References Cited

U.S. PATENT DOCUMENTS

2020/0037354 A1*    1/2020    Li ...................... H04W 74/0808
2020/0154471 A1*    5/2020    Sun ..................... H04W 74/006
(Continued)

FOREIGN PATENT DOCUMENTS

CN        110856180 A        2/2020
CN        111800887 A        10/2020

OTHER PUBLICATIONS

Qualcomm Incorporated, "uplink enhancements for URLLC in unlicensed controlled environments", R1-2006801, 3GPP TSG-RAN WG1 Meeting #102-e; e-Meeting, Aug. 17-28, 2020(Aug. 28, 2020).

(Continued)

*Primary Examiner* — Alpus Hsu
(74) *Attorney, Agent, or Firm* — ScienBiziP, P.C.

(57)        ABSTRACT

A UE and a method for FBE operation in an unlicensed band are provided. The method receives DCI scheduling a PUSCH and indicating that an initiator of a CO of a FFP for the scheduled PUSCH is the UE. The method initiates the CO by transmitting a configured PUSCH within the CO when a DL signal has not been detected within a second FFP before a start time of the configured PUSCH, wherein the scheduled PUSCH is immediately after the configured PUSCH. The method transmits the scheduled PUSCH within the CO after receiving the DCI. The start time of the configured PUSCH is aligned with a start time of the FFP, an end time of the configured PUSCH is before start times of idle periods of both FFPs, and the second FFP overlaps the FFP and is used when the BS operates as an initiating device for the FBE operation.

9 Claims, 5 Drawing Sheets

300

302 ⌐ Receive, from a BS, DCI scheduling a scheduled PUSCH and indicating that an initiator of a CO of an FFP for the scheduled PUSCH is the UE 304 ⌐ Initiate the CO of the FFP by transmitting a configured PUSCH within the CO of the FFP to the BS after determining that a DL signal has not been detected within a second FFP before a start time of the configured PUSCH, the scheduled PUSCH being immediately after the configured PUSCH 306 ⌐ Transmit, to the BS, the scheduled PUSCH within the CO of the FFP after receiving the DCI

(51) Int. Cl.
  *H04W 72/1273*  (2023.01)
  *H04W 72/23*  (2023.01)
  *H04W 72/232*  (2023.01)
  *H04W 74/0808*  (2024.01)

(56)  References Cited

U.S. PATENT DOCUMENTS

| | | | |
|---|---|---|---|
| 2020/0305191 A1 | 9/2020 | Moon et al. | |
| 2020/0351919 A1 | 11/2020 | Oh et al. | |
| 2020/0396767 A1* | 12/2020 | Talarico | H04W 74/0808 |
| 2020/0404688 A1* | 12/2020 | Park | H04W 72/1268 |
| 2021/0084683 A1* | 3/2021 | Li | H04W 74/0808 |
| 2021/0298072 A1* | 9/2021 | Oh | H04W 72/0446 |
| 2021/0360421 A1* | 11/2021 | Wang | H04W 74/006 |
| 2022/0159723 A1 | 5/2022 | Jiang | |
| 2023/0262691 A1* | 8/2023 | Fu | H04W 16/14 |
| | | | 370/329 |
| 2023/0284261 A1* | 9/2023 | Xu | H04W 74/006 |
| | | | 370/328 |
| 2023/0354275 A1* | 11/2023 | Moon | H04W 74/0808 |

OTHER PUBLICATIONS

Moderator (Ericsson), "Summary#6—URLLC/IIoT operation on Unlicensed Band", R1-2102175, 3GPP TSG RAN WG1 Meeting #104-e; E-meeting, Jan. 25-Feb. 5, 2021(Feb. 5, 2021).

ETSI EN 301 893 V2.1.1 (May 2017); 5 GHz RLAN; Harmonised Standard covering the essential requirements of article 3.2 of Directive 2014/53/EU.

3rd Generation Partnership Project; Technical Specification Group Radio Access Network; NR; Physical channels and modulation (Release 16). 3GPP TS 38.211 V16.0.0 (Dec. 2019).

3rd Generation Partnership Project; Technical Specification Group Radio Access Network; NR; Requirements for support of radio resource management (Release 16). 3GPP TS 38.133 V16.0.0 (Jun. 2019).

3rd Generation Partnership Project; Technical Specification Group Radio Access Network; NR; Radio Resource Control (RRC) protocol specification (Release 16). 3GPP TS 38.331 V16.0.0 (Mar. 2020).

* cited by examiner

300

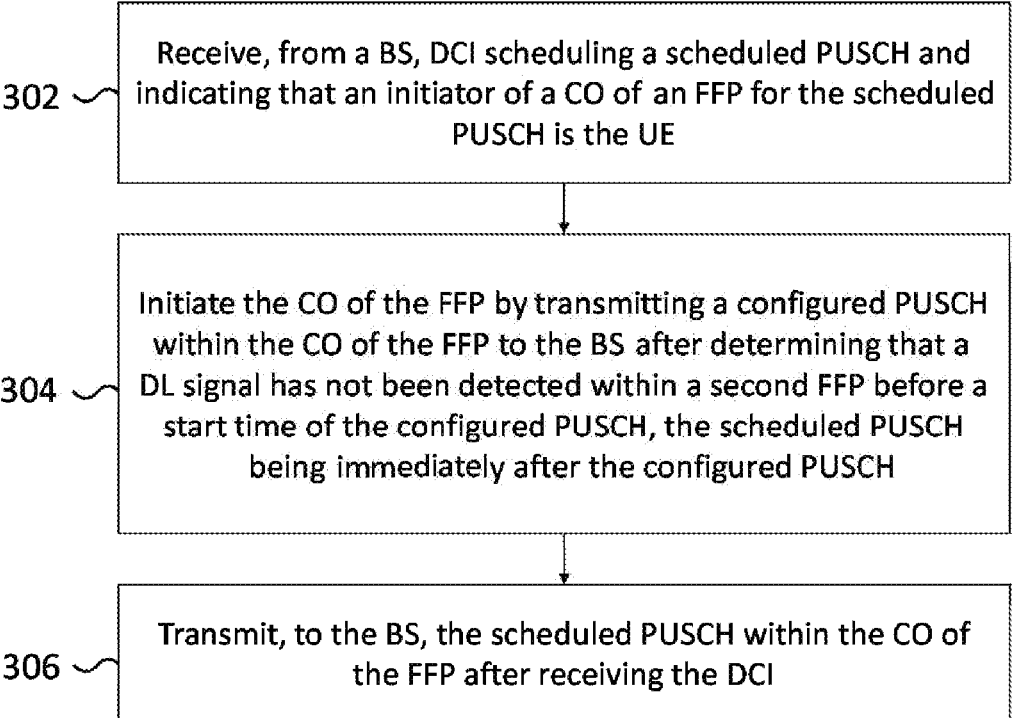

302 — Receive, from a BS, DCI scheduling a scheduled PUSCH and indicating that an initiator of a CO of an FFP for the scheduled PUSCH is the UE 304 — Initiate the CO of the FFP by transmitting a configured PUSCH within the CO of the FFP to the BS after determining that a DL signal has not been detected within a second FFP before a start time of the configured PUSCH, the scheduled PUSCH being immediately after the configured PUSCH 306 — Transmit, to the BS, the scheduled PUSCH within the CO of the FFP after receiving the DCI

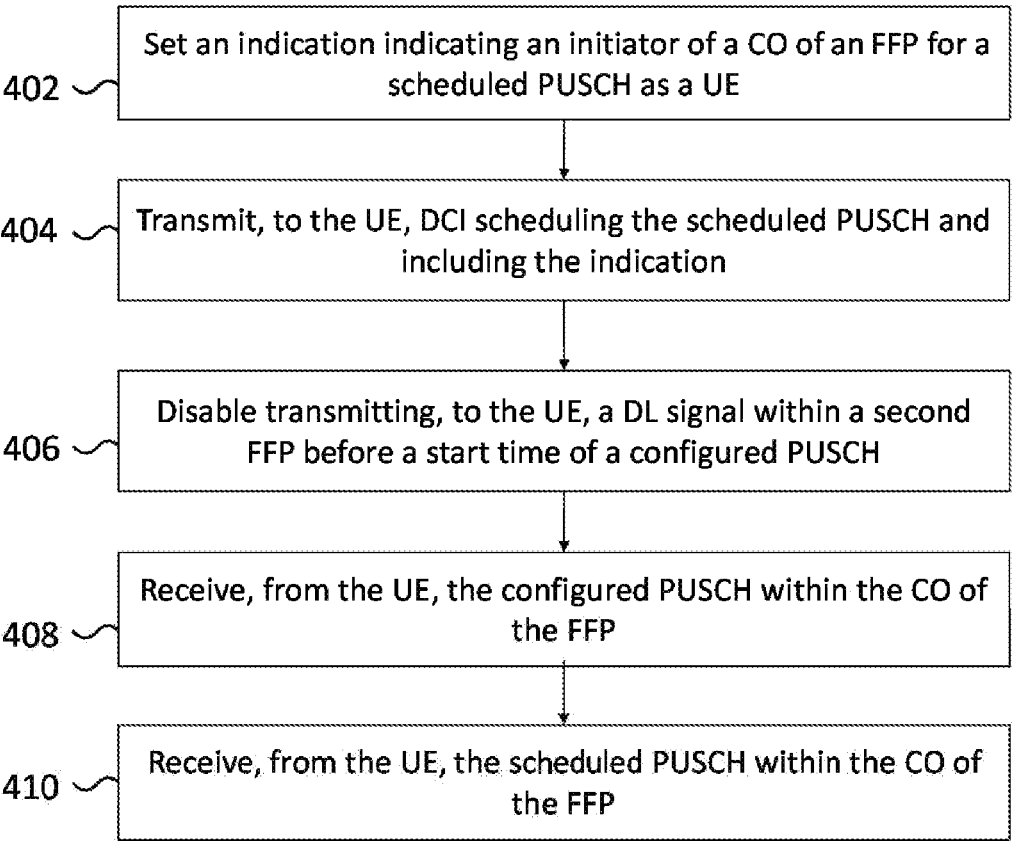

402 — Set an indication indicating an initiator of a CO of an FFP for a scheduled PUSCH as a UE 404 — Transmit, to the UE, DCI scheduling the scheduled PUSCH and including the indication 406 — Disable transmitting, to the UE, a DL signal within a second FFP before a start time of a configured PUSCH 408 — Receive, from the UE, the configured PUSCH within the CO of the FFP 410 — Receive, from the UE, the scheduled PUSCH within the CO of the FFP

FIG. 4

USER EQUIPMENT AND METHOD FOR FRAME-BASED EQUIPMENT OPERATION IN AN UNLICENSED BAND

CROSS-REFERENCE TO RELATED APPLICATION(S)

The present disclosure is a National Stage Application of International Patent Application Serial No. PCT/CN2022/085573, filed on Apr. 7, 2022, which claims the benefit of and priority to U.S. Provisional Patent Application Ser. No. 63/171,961, filed on Apr. 7, 2021, and U.S. Provisional Patent Application Ser. No. 63/171,953, filed on Apr. 7, 2021, the contents of all which are hereby incorporated herein fully by reference into the present disclosure for all purposes.

FIELD

The present disclosure is related to wireless communication, and more specifically, to a user equipment (UE) and a method for a frame-based equipment (FBE) operation in an unlicensed band in a next-generation wireless communication network.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing the network services and types and accommodating various use cases, such as enhanced Mobile Broadband (eMBB), massive Machine-Type Communication (mMTC), and Ultra-Reliable and Low-Latency Communication (URLLC).

However, as the demand for radio access continues to grow, there is a need for further improvements in wireless communication in the next-generation wireless communication system.

SUMMARY

The present disclosure is related to a method for an FBE operation in an unlicensed band performed by a UE.

According to a first aspect of the present disclosure, a method for a frame-based equipment (FBE) operation in an unlicensed band performed by a user equipment (UE) is provided. The method includes receiving, from a base station (BS), downlink control information (DCI) scheduling a scheduled physical uplink shared channel (PUSCH) and indicating that an initiator of a channel occupancy (CO) of a fixed frame period (FFP) for the scheduled PUSCH is the UE; initiating the CO of the FFP by transmitting a configured PUSCH within the CO of the FFP to the BS after determining that a downlink (DL) signal has not been detected within a second FFP before a start time of the configured PUSCH, the scheduled PUSCH being immediately after the configured PUSCH; and transmitting, to the BS, the scheduled PUSCH within the CO of the FFP after receiving the DCI, wherein the start time of the configured PUSCH is aligned with a start time of the FFP, an end time of the configured PUSCH is before a start time of an idle period of the FFP and a start time of an idle period of the second FFP, and the second FFP overlaps the FFP and is used when the BS operates as an initiating device for the FBE operation.

According to an implementation of the first aspect, the end time of the configured PUSCH and a start time of the scheduled PUSCH are in consecutive symbols.

According to an implementation of the first aspect, the method further includes determining whether a channel of the unlicensed band is clear by performing a clear channel assessment (CCA) on the channel; and transmitting the configured PUSCH on the channel after determining that the channel is clear.

According to an implementation of the first aspect, the method further includes receiving, from the BS, a first parameter indicating a first periodicity and a starting offset of the FFP; and receiving, from the BS, a second parameter indicating a second periodicity of the second FFP.

According to a second aspect of the present disclosure, a user equipment (UE) for a frame-based equipment (FBE) operation in an unlicensed band is provided. The UE includes one or more non-transitory computer-readable media storing one or more computer-executable instructions and at least one processor that is coupled to the one or more non-transitory computer-readable media. The at least one processor is configured to execute the one or more computer-executable instructions to cause the UE to: receive, from a base station (BS), downlink control information (DCI) scheduling a scheduled physical uplink shared channel (PUSCH) and indicating that an initiator of a channel occupancy (CO) of a fixed frame period (FFP) for the scheduled PUSCH is the UE; initiate the CO of the FFP by transmitting a configured PUSCH within the CO of the FFP to the BS after determining that a downlink (DL) signal has not been detected within a second FFP before a start time of the configured PUSCH, the scheduled PUSCH being immediately after the configured PUSCH; and transmit, to the BS, the scheduled PUSCH within the CO of the FFP after receiving the DCI, wherein the start time of the configured PUSCH is aligned with a start time of the FFP, an end time of the configured PUSCH is before a start time of an idle period of the FFP, and a start time of an idle period of the second FFP, and the second FFP overlaps the FFP and is used when the BS operates as an initiating device for the FBE operation.

According to a third aspect of the present disclosure, a communication system for a frame-based equipment (FBE) operation in an unlicensed band is provided. The communication system includes a base station (BS) configured to: set an indication indicating an initiator of a channel occupancy (CO) of a fixed frame period (FFP) for a scheduled physical uplink shared channel (PUSCH) is a user equipment (UE); transmit, to the UE, downlink control information (DCI) to schedule the scheduled PUSCH and to indicate the indication; and disable transmitting, to the UE, a downlink (DL) signal within a second FFP before a start time of a configured PUSCH; and the UE configured to: initiate the CO of the FFP by transmitting the configured PUSCH within the CO of the FFP to the BS after determining that the DL signal has not been detected within the second FFP before the start time of the configured PUSCH, the scheduled PUSCH being immediately after the configured PUSCH; and transmit, to the BS, the scheduled PUSCH within the CO of the FFP after receiving the DCI, wherein the start time of the configured PUSCH is aligned with a start time of the FFP, an end time of the configured PUSCH is before a start time of an idle period of the FFP and a start time of an idle period of the second FFP, and the second FFP overlaps the FFP and is used when the BS operates as an initiating device for the FBE operation.

According to an implementation of the third aspect, the end time of the configured PUSCH and a start time of the scheduled PUSCH are in consecutive symbols.

According to an implementation of the third aspect, the UE is further configured to determine whether a channel of the unlicensed band is clear by performing a clear channel assessment (CCA) on the channel; and transmit the configured PUSCH on the channel after determining that the channel is clear.

According to an implementation of the third aspect, the BS is further configured to transmit, to the UE, a first parameter indicating a first periodicity and a starting offset of the FFP; and transmit, to the UE, a second parameter indicating a second periodicity of the second FFP.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

FIG. 3 is a flowchart illustrating a method performed by a UE for an FBE operation in an unlicensed band, according to an example implementation of the present disclosure.

FIG. 4 is a flowchart illustrating a method performed by a BS for an FBE operation in an unlicensed band, according to an example implementation of the present disclosure.

DESCRIPTION

Figure 1:
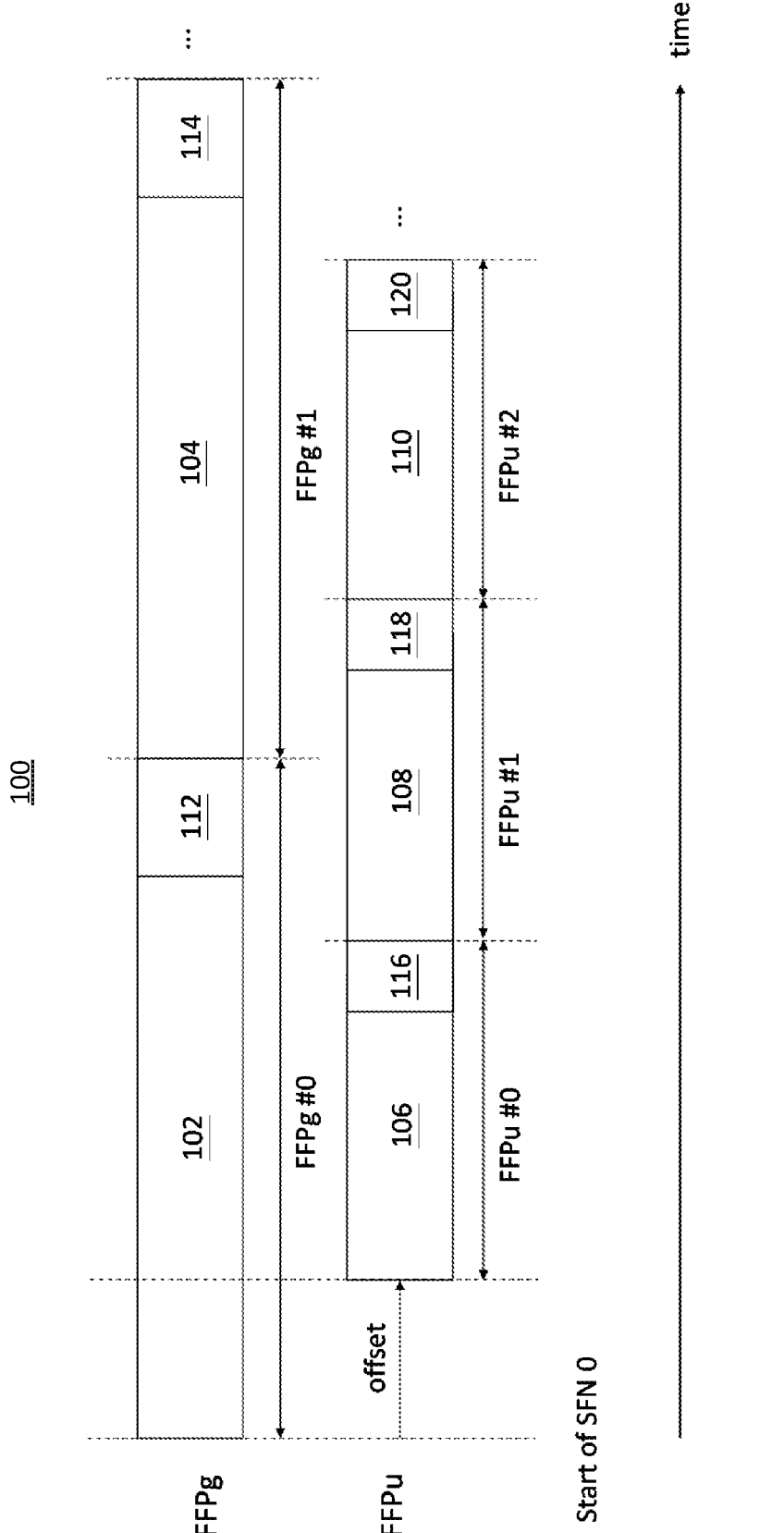
FIG. 1 is a timing diagram illustrating the configurations of fixed frame periods (FFPs), according to an example implementation of the present disclosure.

Some of the acronyms in the present disclosure are defined as follows and unless otherwise specified, the acronyms have the following meanings:

| Abbreviation | Full name |
| --- | --- |
| 3GPP | $3^{rd}$ Generation Partnership Project |
| 5G | $5^{th}$ Generation |
| 5GC | 5G Core |
| BS | Base Station |
| BSC | Base Station Controller |
| CA | Carrier Aggregation |
| CCA | Clear Channel Assessment |
| CG | Configured Grant |
| CN | Core Network |
| CO | Channel Occupancy |
| CORESET | Control Resource Set |
| COT | Channel Occupancy Time |
| CP | Cyclic Prefix |
| DC | Dual Connectivity |
| DCI | Downlink Control Information |
| DG | Dynamic Grant |
| DL | Downlink |
| E-UTRA(N) | Evolved Universal Terrestrial Radio Access (Network) |
| eMBB | enhanced Mobile Broadband |
| eNB | evolved Node B |

-continued

| Abbreviation | Full name |
| --- | --- |
| EN-DC | E-UTRA NR Dual Connectivity |
| EPC | Evolved Packet Core |
| FBE | Frame-Based Equipment |
| FDRA | Frequency Domain Resource Allocation |
| FFP | Fixed Frame Period |
| GC-PDCCH | Group Common-Physical Downlink Control Channel |
| gNB | Next-Generation Node B |
| GSM | Global System for Mobile communications |
| IE | Information Element |
| IIoT | Industrial Internet of Things |
| LBE | Load-based Equipment |
| LBT | Listen-Before-Talk |
| LDPC | Low-Density Parity-Check |
| LTE | Long Term Evolution |
| LTE-A | LTE-Advanced |
| MCG | Master Cell Group |
| MeNB | Master eNB |
| mMTC | massive Machine-Type Communication |
| MN | Master Node |
| MR-DC | Multi-RAT Dual Connectivity |
| MsgA | Message A |
| NB | Node B |
| ng-eNB | next-generation eNB |
| NGC | Next-Generation Core |
| NR | New Radio |
| NR-U | NR-Unlicensed |
| OFDM | Orthogonal Frequency-Division Multiplexing |
| PBCH | Physical Broadcast Channel |
| PCell | Primary Cell |
| PDCCH | Physical Downlink Control Channel |
| ProSe | Proximity Service |
| PSCell | Primary Secondary Cell/Primary SCG Cell |
| PUSCH | Physical Uplink Shared Channel |
| RAN | Radio Access Network |
| RAT | Radio Access Technology |
| RB | Resource Block |
| Rel-15 | 3GPP Release 15 |
| Rel-16 | 3GPP Release 16 |
| RLAN | Radio Local Area Network |
| RMSI | Remaining Minimum System Information |
| RNC | Radio Network Controller |
| RRC | Radio Resource Control |
| SCell | Secondary Cell |
| SCG | Secondary Cell Group |
| SCS | Subcarrier Spacing |
| SFN | System Frame Number |
| SgNB | Secondary gNB |
| SIB | System Information Block |
| SIB1 | System Information Block Type 1 |
| SL | SideLink |
| SN | Secondary Node |
| SpCell | Special Cell |
| SSB | Synchronization Signal Block |
| TA | Timing Advance/Time Alignment |
| TS | Technical Specification |
| UE | User Equipment |
| UL | Uplink |
| UMTS | Universal Mobile Telecommunications System |
| URLLC | Ultra-Reliable Low-Latency Communication |
| UTRAN | Universal Terrestrial Radio Access Network |
| V2X | Vehicle-to-Everything |
| WI | Working Item |

The following contains specific information related to example implementations of the present disclosure. The drawings and their accompanying detailed description are merely directed to example implementations. However, the present disclosure is not limited to these example implementations. Other variations and implementations of the present disclosure will be obvious to those skilled in the art.

Unless noted otherwise, like or corresponding elements among the drawings may be indicated by like or corresponding reference designators. Moreover, the drawings and illustrations in the present disclosure are generally not to scale, and are not intended to correspond to actual relative dimensions.

For the purpose of consistency and ease of understanding, like features may be identified (although, in some examples, not illustrated) by the same reference designators in the drawings. However, the features in different implementations may differ in other respects and may not be narrowly confined to the implementations illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

The terms "if", "in a case that", "when", "after", "upon", and "once" may be used interchangeably.

The terms "start time", "start position", "start boundary", "start point", "starting time", "starting position", "starting boundary", and "starting point" may be used interchangeably. The terms "end time", "end position", "end boundary", "end point", "ending time", "ending position", "ending boundary", and "ending point" may be used interchangeably.

The terms "CO" and "COT" may be used interchangeably.

For the purposes of explanation and non-limitation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or using one or more Digital Signal Processors (DSPs). Although some of the disclosed implementations are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as an LTE system, an LTE-A system, an LTE-Advanced Pro system, or a 5G NR RAN may typically include at least one BS, at least one UE, and one or more optional network elements that provide connection within a network. The UE may communicate with the network, such as a CN, an EPC network, an E-UTRAN, an NGC, a 5GC, or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least an RAT such as Worldwide Interoperability for Microwave Access (WiMAX), Global System for Mobile communications (GSM that is often referred to as 2G), GSM Enhanced Data rates for GSM Evolution (EDGE) RAN (GERAN), General Packet Radio Service (GPRS), Universal Mobile Telecommunication System (UMTS that is often referred to as 3G) based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, an NB in the UMTS, an eNB in LTE or LTE-A, an RNC in UMTS, a BSC in the GSM/GERAN, an ng-eNB in an E-UTRA BS in connection with 5GC, a gNB in the 5G-RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate SL resources for supporting ProSe, LTE SL services, and/or LTE/NR V2X services. Each cell may have overlapped coverage areas with other cells.

In MR-DC cases, the primary cell of an MCG or an SCG may be called an SpCell. A PCell may refer to the SpCell of an MCG. A PSCell may refer to the SpCell of an SCG. An MCG may refer to a group of serving cells associated with the MN, including the SpCell and optionally one or more SCells. An SCG may refer to a group of serving cells associated with the SN, including the SpCell and optionally one or more SCells.

As disclosed above, the frame structure for NR supports flexible configurations for accommodating various next-generation (e.g., 5G) communication requirements such as eMBB, mMTC, and URLLC, while fulfilling high reliability, high data rate and low latency requirements. The OFDM technology in the 3GPP may serve as a baseline for an NR waveform. The scalable OFDM numerology such as adaptive sub-carrier spacing, channel bandwidth, and CP may also be used.

Two coding schemes are considered for NR, specifically LDPC code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable (e.g., based on the network dynamics of NR). SL resources may also be provided in an NR frame to support ProSe services, V2X services (e.g., E-UTRA V2X SL communication services) or SL services (e.g., NR SL communication services). In contrast, SL resources may also be provided in an E-UTRA frame to support ProSe services, V2X services (e.g., E-UTRA V2X SL communication services) or SL services (e.g., NR SL communication services).

Any two or more than two of the following sentences, paragraphs, (sub)-bullets, points, actions, behaviors, terms, alternatives, aspects, examples, or claims described in the following disclosure may be combined logically, reasonably, and properly to form a specific method.

Any sentence, paragraph, (sub)-bullet, point, action, behaviors, terms, alternatives, aspects, examples, or claims described in the following disclosure may be implemented independently and separately to form a specific method.

Dependency (e.g., "based on", "more specifically", "preferably", "In one embodiment", "In some implementations", "In one alternative", "In one example", "In one aspect", or etc.) in the following disclosure is just one possible example which may not restrict the specific method.

Example descriptions of some selected terms, examples, embodiments, implementations, actions, and/or behaviors used in the present disclosure are given as follows.

The terms "network", "RAN", "cell", "camped cell", "serving cell", "BS", "gNB", "eNB" and "ng-eNB" may be used interchangeably. In some implementations, some of these items may refer to the same network entity.

Cell: A cell may be a radio network object that may be uniquely identified by a UE from a (cell) identification that is broadcast over a geographical area from one UTRAN Access Point. The Cell may be either in an FDD or a TDD mode.

Serving cell: For a UE in an RRC_CONNECTED state that is not configured with CA or DC, there may be only one serving cell, which may be referred to as a PCell. For a UE in the RRC_CONNECTED state that is configured with CA or DC, the term "serving cells" may be used to denote a set of cells including SpCell(s) and all SCells. For example, the serving cell may be a PCell, a PSCell, or an Scell, as described, for example, in the 3GPP TS 38.331.

A UE (operating) in the RRC_CONNECTED state may be referred to as an RRC_CONNECTED UE. A UE (operating) in an RRC_IDLE state may be referred to as an RRC_IDLE UE. A UE (operating) in an RRC_INACTIVE state may be referred to as an RRC_INACTIVE UE.

SpCell: For a DC operation, the term SpCell may refer to a PCell of an MCG or a PSCell of an SCG. Otherwise, the term SpCell may refer to the PCell.

The disclosed mechanisms may be applied to any RAT. The RAT may include, but is not limited to, an NR, an NR-U, an LTE, an E-UTRA connected to 5GC, an LTE connected to 5GC, an E-UTRA connected to EPC, and an LTE connected to EPC. The disclosed mechanisms may be applied to/by UEs that are in public networks, or in private networks.

Dedicated signaling may refer to (but is not limited to) RRC message(s). For example, the RRC message(s) may include an RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. RRC message may be one kind of dedicated signaling. The UE may receive the RRC message from the network via unicast/broadcast/groupcast.

The RRC_CONNECTED UE, RRC_INACTIVE UE, and RRC_IDLE UE may apply the UE behaviors described in the present disclosure.

Generally, the disclosed mechanisms may be applied for the PCell and the UE. In addition, the mechanisms described in the present disclosure may be applied for the PSCell and the UE.

MR-DC: An MR-DC may be a DC between E-UTRA and NR nodes, or between two NR nodes. The MR-DC may include an EN-DC, an NR-E-UTRA Dual Connectivity (NE-DC), an NG-RAN an E-UTRA-NR Dual Connectivity (NGEN-DC), and an NR-NR Dual Connectivity (NR-DC) (mode).

MCG: An MCG may be, in MR-DC, a group of serving cells associated with an MN including an SpCell (e.g., a PCell) and optionally one or more SCells.

MN: An MN may be, in MR-DC, a radio access node that provides a control plane connection to a CN. The MN may be a Master eNB (e.g., in EN-DC), a Master ng-eNB (e.g., in NGEN-DC), or a Master gNB (e.g., in NR-DC and NE-DC).

SCG: An SCG may be, in MR-DC, a group of serving cells associated with an SN including an SpCell (e.g., a PSCell) and optionally one or more SCells.

SN: An SN may be, in MR-DC, a radio access node, with no control plane connection to a CN, providing additional resources to a UE. The SN may be an en-gNB (e.g., in EN-DC), a Secondary ng-eNB (e.g., in NE-DC), or a Secondary gNB (e.g., in NR-DC and NGEN-DC).

MeNB: An MeNB may be an eNB as a master node associated with an MCG in MR-DC (scenarios).

SgNB: An SgNB may be a gNB as a secondary node associated with an SCG in MR-DC (scenarios).

FBE: An FBE may be an equipment in which the transmit/receive structure has a periodic timing with a periodicity equal to an FFP. The FBE may implement an LBT-based channel access mechanism to detect the presence of other RLAN transmission(s) on an operating channel.

CCA: A CCA may be a mechanism used (or performed) by an equipment to identify other transmission(s) on a channel.

COT: COT may be the total time for which a gNB/UE and any gNB/UE(s) sharing the CO perform transmission(s) on a channel after the gNB/UE performs the corresponding channel access procedures.

CG: A gNB may allocate (or configure) UL resources for the initial HARQ transmissions to UEs. The allocated (or configured) UL resource may be referred to as CG. Two types of CGs may be described as follows.

Type 1: The RRC layer (e.g., an RRC entity of the gNB) may directly provide the configured uplink grant (e.g., including the periodicity).

Type 2: The RRC layer (e.g., an RRC entity of the gNB) may define the periodicity of the configured uplink grant while a PDCCH addressed to the CS-RNTI may either signal and activate, or deactivate, the configured uplink grant. The PDCCH addressed to the CS-RNTI may indicate that the UL grant may be implicitly reused according to the periodicity defined by the RRC until the configured UL grant is deactivated.

$T_{proc,2}$ $T_{proc,2}$ may be a time duration (or period) for a PUSCH preparation (procedure). $T_{proc,2}$ may be calculated according to the following Equation (1).

$$T_{proc,2} = \max((N_2 + d_{2,1})(2048 + 144) \cdot \kappa \cdot 2^{-\mu} \cdot T_C, d_{2,2}) \quad \text{Equation (1)}$$

The notations used in Equation (1) are described in the 3GPP TS 38 series specifications. For example, $N_2$ may be based on the UE processing capability. $\mu$ may correspond to one of the $(\mu_{DL}, \mu_{UL})$ resulting with the largest $T_{proc,2}$. $\mu_{DL}$ may correspond to the subcarrier spacing of the downlink channel with which the PDCCH carrying the DCI scheduling the PUSCH was transmitted. $\mu_{UL}$ may correspond to the subcarrier spacing of the uplink channel with which the PUSCH is to be transmitted. $\kappa$ and $T_C$ are defined in the 3GPP TS 38.211.

If the first symbol of the PUSCH allocation includes (or consists of) DM-RS only, $d_{2,1}$ may be 0; otherwise $d_{2,1}$ may be 1.

If the UE is configured with multiple active component carriers, the first uplink symbol in the PUSCH allocation may include the effect of timing difference between component carriers, as described in the 3GPP TS 38.133.

If the scheduling DCI triggers a switching of the BWP, $d_{2,2}$ may be equal to the switching time, as defined in the 3GPP TS 38.133; otherwise $d_{2,2}$ may be 0.

In Rel-16 NR, operations in an unlicensed band may be supported after completion of NR-U WI. NR-U supports the LBE and FBE operation modes. Details about these modes may be found in ETSI EN 301 893.

In Rel-17 NR, for some use cases (e.g., IIoT), there may be a need to support unlicensed operations in controlled environments, such as an environment that may include (only) devices that operate on the unlicensed band (e.g., installed by the facility owner) and in which unexpected interference (e.g., from other systems and/or RATs) (only) may occasionally occur.

In a controlled environment, an FBE operation may be considered due to having lower overhead of channel sensing. Since most features introduced in Rel-16 NR-U target the LBE operation, investigation on potential enhancement for the FBE operation may be needed for the IIoT use cases in the controlled environments.

An FBE may be an equipment in which the transmit/receive structure has a periodic timing with a periodicity equal to an FFP. Two types of devices may be defined for the FBE operation. A device that initiates (a sequence of) one or more transmissions may be defined as an initiating device; otherwise, the device is defined as a responding device. The regulation of the FBE operation (e.g., described in ETSI EN 301 893) may be as follows.

FFPs supported by an equipment may be declared by the manufacturer. An FFP may be within the range of 1 ms to 10 ms. Transmission(s) may start (only) at the beginning of an FFP. The equipment may change its (associated) FFP. The equipment may not change the FFP more than once every 200 ms.

To initiate (a sequence of) one or more transmissions, an initiating device may perform a CCA check during a single observation slot right before starting the transmissions on an operating channel at the start of an FFP. If the operating channel is found to be clear, the initiating device may start the transmission immediately. Otherwise, there may be no transmission on that channel until (or during) the next FFP.

An initiating device may be allowed to grant an authorization to one or more associated responding devices to transmit on the current operating channel within the current COT. A responding device may perform transmission(s) without performing a CCA check if the responding device receives a grant and if these transmission(s) are initiated at most 16 s after the last transmission by the initiating device that issued the grant.

In addition, a responding device may perform a CCA check on the operating channel during a single observation slot within a 25 μs period, which ends right before the granted transmission time that is at least 16 μs later than the last transmission by the initiating device that issued the grant.

In Rel-16 NR-U, a gNB may operate as an initiating device (e.g., when the FBE operation is used in a cell with shared spectrum channel access). An FBE operation may also be referred to as a semi-static channel access. The gNB may provide an FFP configuration via a SIB1 or dedicated RRC signaling. The FFP may be restricted to particular values, such as {1 ms, 2 ms, 2.5 ms, 4 ms, 5 ms, 10 ms}. The starting positions of the FFPs within every two radio frames may start from an even radio frame and may be given by i*P where i={0, 1, . . . , 20/P−1} and P may be the FFP in milliseconds. The idle period for a given SCS=ceil (minimum idle period allowed by regulations/Ts), where the minimum idle period allowed=max (5% of FFP, 100 us), Ts is the symbol duration for the given SCS, ceil(x) is the ceiling function that maps x to the least integer greater than or equal to x, and max(x, y) is the maximum function that gives the largest value among x and y. UE transmissions within an FFP may occur if DL signals/channels (e.g., PDCCH, SSB, PBCH, RMSI, GC-PDCCH, etc.) within the FFP are detected.

A PRACH resource may be considered invalid if the PRACH resource overlaps an idle period of an FFP when the FBE operation is indicated.

For some IIoT use cases (e.g., machine tool and packaging machine identified in TR 22.804), a scheduling cycle may be short (e.g., less than 1 ms). For such uses cases, CG with a short periodicity (e.g., equal to or less than 1 slot) may be configured for UL data transmission. For such a scenario, a UE may initiate an FFP, since the UE may transmit a CG PUSCH in the FFP without detecting a DL signal transmitted by a gNB, which may save DL signal overhead. Furthermore, periodicities of FFPs initiated by the UE may be configured to be more aligned with the periodicity of UL data, which may provide more PUSCH resource and save overhead of the idle period when the periodicities of FFPs initiated by the UE are shorter than the periodicities of FFPs initiated by the gNB. In some implementations, by (configuring) a CG PUSCH with the starting symbol aligned with the start boundary of an FFP, the UE may initiate the FFP and start the CG PUSCH transmission after performing a CCA in a 9 μs period ending right before the start boundary of the FFP.

Implementations for determining whether the UE may initiate the FFP for the above cases may be as follows. Specifically, the implementations may be applied for determining whether a configured UL transmission, which is aligned with a UE FFP boundary and which ends before an idle period of that UE FFP, is based on a UE-initiated COT or sharing a gNB-initiated COT.

> If the transmission is confined within a gNB FFP before the idle period of that gNB FFP, and the UE has already determined that the gNB initiates that gNB FFP, the UE may assume that the configured UL transmission corresponds to the gNB-initiated COT. Otherwise, the UE may assume that the configured UL transmission corresponds to a UE-initiated COT.

> The UE assumes that the configured UL transmission corresponds to the UE-initiated COT.

In some other implementations, by (scheduling) a DG PUSCH with the starting symbol aligned with the start boundary of an FFP, the UE may initiate the FFP and start the DG PUSCH transmission after performing a CCA in a 9 μs period ending right before the start boundary of the FFP. Whether the UE should initiate an FFP may be indicated by the DCI when the DCI schedules a DG PUSCH with the starting symbol aligned with the starting boundary of the FFP. If the DCI indicates to the UE not to initiate the FFP, the UE may transmit the DG PUSCH in an FFP initiated by the gNB. In some implementations, if the DCI does not indicate whether the UE should initiate the FFP, the above-described implementations for the CG PUSCH may be applied for determining whether the UE should initiate the FFP. Whether the DCI includes the indication may be configured by the gNB.

Configurations of FFPs initiated by a UE may be provided by a gNB via system information or via dedicated RRC signaling. An offset may be provided for the FFPs initiated by the UE. The offset may be defined relative to a specific system frame (e.g., SFN 0). When the offset is provided for the FFPs initiated by the UE, FFPs initiated by the gNB and the FFPs initiated by the UE may be overlapped (or staggered). For simplicity, an FFP initiated by (for, of, associated with, or corresponding to) the gNB is denoted as an FFPg and an FFP initiated by the UE is denoted as an FFPu.

It should be noted that a transmission based on an FFPu may be equivalent to a transmission within an FFPu and may represent that the transmission follows the regulation (e.g., a channel sensing mechanism) of the FFPu. In addition, a transmission based on an FFPg may be equivalent to a transmission within an FFPg and may represent that the transmission follows the regulation (e.g., a channel sensing mechanism) of the FFPg.

FIG. 1 is a timing diagram 100 illustrating the configurations of FFPs, according to an example implementation of the present disclosure. As shown in FIG. 1, FFPg #0 includes two time periods 102 and 112. The time periods 102 and 112 may indicate (or represent) a COT and an idle period of FFPg #0, respectively. The time period 102 may include a communication period (e.g., for transmitting data). The time period 112 may include a sensing period (e.g., for performing a CCA). Similarly, FFPg #1 includes two time periods 104 and 114. The time periods 104 and 114 may indicate (or represent) a COT and an idle period of FFPg #1, respectively. The time period 104 may include a communication period (e.g., for transmitting data). The time period 114 may include a sensing period (e.g., for performing a CCA). For example, a gNB (or a UE) may determine whether a channel is clear by performing a CCA on the channel within the time period 112. The gNB (or the UE) may acquire (or initiate) the channel within the time period 104 after determining that the channel is clear.

In addition, FFPu #0 includes two time periods 106 and 116. The time periods 106 and 116 may indicate (or represent) a COT and an idle period of FFPu #0, respectively. The time period 106 may include a communication period (e.g., for transmitting data). The time period 116 may include a sensing period (e.g., for performing a CCA). Similarly, FFPu #1 includes two time periods 108 and 118. The time periods 108 and 118 may indicate (or represent) a COT and an idle period of FFPu #1, respectively. The time period 108 may include a communication period (e.g., for transmitting data). The time period 118 may include a sensing period (e.g., for performing a CCA). FFPu #2 includes two time periods 110 and 120. The time periods 110 and 120 may indicate (or represent) a COT and an idle period of FFPu #2, respectively. The time period 110 may include a communication period (e.g., for transmitting data). The time period 120 may include a sensing period (e.g., for performing a CCA). For example, a UE (or a gNB) may determine whether a channel is clear by performing a CCA on the channel within the time period 118. The UE (or the gNB) may acquire (or initiate) the channel within the time period 110 after determining that the channel is clear. It should be noted that the length and the number of FFPs are not limited to what is shown in the figure.

Issues regarding an FBE operation (e.g., for IIoT) in unlicensed will be discussed as follows.

Determination of UL Transmission Based on an FFPg or an FFPu

For some configurations of FFPg and FFPu, an FFPu may overlap more than one FFPg. For example, FFPu #1 overlaps FFPg #0 and FFPg #1 as shown in FIG. 1. When a UE has initiated FFPu #1, if there is a CG PUSCH or a DG PUSCH that starts after the start boundary of FFPg #1 and ends before the idle period of FFPu #1 (i.e., period 118), the UE may need to determine whether the CG PUSCH or DG PUSCH should be transmitted based on FFPg #1 or FFPu #1, since it is possible that a gNB has initiated FFPg #1 before the start of the CG PUSCH or DG PUSCH.

Determination of a COT Initiator for UL Transmission Aligned with the Start Boundary of an FFPu For an UL transmission that is aligned with the start boundary of an FFPu and ends before an idle period of the FFPu, a UE may determine that the UL transmission is transmitted based on an FFPg if the UL transmission starts after the start boundary of the FFPg and ends before an idle period of the FFPg, and if the UE has already determined that the gNB has initiated the FFPg. In this case, some issues may need to be addressed. For example, if the UL transmission is aligned with the start boundary of FFPu #2, as shown in FIG. 1, and the UL transmission ends before the idle period of FFPu #2 (i.e., period 120), the UE may determine that the UL transmission is transmitted based on FFPg #1 if the UE determines that the gNB has initiated FFPg #1. According to the rule defined in Rel-16 NR-U, the UE may determine that FFPg #1 was initiated by the gNB if any DL signal within FFPg #1 is detected. However, if the UE has initiated FFPu #1 and the gNB has transmitted the DL signal in FFPu #1 to the UE as a responding device, and if the DL signal starts after the idle period of FFPg #0 (i.e., period 112), the UE may determine that the gNB has initiated FFPg #1 after detection of the DL signal, but the gNB may not have initiated FFPg #1. In this case, the UE may mistakenly transmit the UL transmission based on FFPg #1 instead of based on FFPu #2.

UL Transmission Following a CG PUSCH

When a scheduled UL transmission (e.g., scheduled PUSCH) follows (e.g., being immediately after) a CG PUSCH aligned with the start boundary of an FFPu and a UE has initiated the FFPu, if a gap between the CG PUSCH and the scheduled UL transmission is at most 16 μs and the UL transmission ends before an idle period of the FFPu, the UE may transmit the UL transmission based on the FFPu. However, it is possible that a gNB may also indicate to the UE to transmit the UL transmission based on an FFPg by scheduling DCI, but the gap of at least 25 μs needs to be created for the UE to perform a CCA. In this case, how to create the gap may need to be addressed.

When a scheduled UL transmission (e.g., scheduled PUSCH) follows (e.g., being immediately after) a CG PUSCH transmitted based on an FFPg and the scheduled PUSCH is aligned with the start boundary of the FFPu, if a gap between the CG PUSCH and the scheduled UL transmission is less than 9 μs and if the UE is indicated to initiate the FFPu, the UE may not (be able to) initiate the FFPu since a channel on which a CCA is performed may not be assessed as clear after the CCA is performed (e.g., due to the CG PUSCH transmission). In this case, how to create the gap may need to be addressed.

Cross-FFP Scheduling

When a gNB schedules a UL transmission in a second FFPg by DCI in a first FFPg, where the first FFPg is followed by the second FFPg, and if the start of the UL transmission is aligned with the start boundary of an FFPu, a UE may determine that a COT initiator is the gNB by an indication in the DCI. In other words, the UE may assume that the gNB will initiate the second FFPg. However, if the UE does not detect a DL signal in the second FFPg, whether the UE would be able to initiate the FFPu for the UL transmission may need to be addressed.

PUSCH Repetition Type B

When a PUSCH is transmitted with a PUSCH repetition type B, repetitions of the PUSCH may cross multiple FFPus. If one or more of the repetitions of the PUSCH are transmitted based on an FFPu, an actual transmission overlapping an idle period of the FFPu may not be transmitted. In this case, a method may be needed to handle the number of actual repetitions being dropped due to overlapping the idle period of the FFPu.

Implementations for handling the above issues will be discussed as follows.

Determination of UL Transmission Based on an FFPg or an FFPu

The following implementations may be applied for a scenario where an FFPu (e.g., FFPu #1) overlaps more than one FFPg (e.g., FFPg #0 and FFPg #1) and the end boundary of the idle period of a first FFPg (e.g., FFPg #0) is aligned with the start boundary of a second FFPg (e.g., FFPg #1).

When a UE has initiated the FFPu, if there is UL transmission that starts after the start boundary of the second FFPg and ends before the idle period of the FFPu, the UE may determine that the UL transmission is transmitted based on the FFPu if at least one of the following conditions is satisfied.

The UE detects a DL signal in the idle period of the first FFPg.

The UE receives a response from a gNB in the FFPu (e.g., UE-specific DCI or group common DCI including information dedicated for the UE).

The UE does not detect a DL signal in the second FFPg.

The start symbol of the UL transmission is a number of symbols that is smaller than a time duration relative to the first symbol that contains in the second FFPg. The time duration may be configurable or may be a time duration for a processing that depends on the UE capability (e.g., $T_{proc,2}$).

The start symbol of the UL transmission is a number of symbols that is smaller than a time duration relative to a last symbol of a CORESET (e.g., in which the UE detects a DCI format 2_0 that including an indication of a remaining channel occupancy duration). The time duration may be configurable or may be a time duration for a processing that depends on the UE capability (e.g., $T_{proc,2}$).

The UE detects a DCI format 2_0 indicating the remaining channel occupancy duration ends before or in the last symbol of the CORESET where the UE detected the DCI format 2_0.

The first symbol that included in the second FFPg is indicated as UL or flexible by configuration(s) (e.g., tdd-UL-DL-ConfigurationCommon and tdd-UL-DL-ConfigurationDedicated), or indicated as UL by a DCI format 2_0.

CP extension of the UL transmission is configured or indicated as 0 or X OFDM symbols (OS)—16 μs or X OS—16 μs—TA, where X equals to an integer number.

The UL transmission is not UL transmission allocated within a multi-TTI transmission that includes at least UL transmission ending not before the idle period of the FFPu.

The UL transmission is not UL transmission with repetitions that includes at least one repetition ending not before the idle period of the FFPu.

In some other implementations, the UE may determine that the UL transmission is transmitted based on the second FFPg if at least one of the following conditions is satisfied.

The UE does not detect a DL signal in the idle period of the first FFPg.

The UE detects a DL signal in the second FFPg.

The UE does not receive a response from a gNB in the FFPu (e.g., UE-specific DCI or group common DCI including information dedicated for the UE).

The UE detects a DCI format 20 indicating the remaining channel occupancy duration ends after the last symbol of the CORESET where the UE detected the DCI format 2_0.

The first symbol that included in the second FFPg is indicated as DL or flexible by configuration(s) (e.g., tdd-UL-DL-ConfigurationCommon and tdd-UL-DL-ConfigurationDedicated), or indicated as DL by a DCI format 2_0.

CP extension of the UL transmission is configured or indicated as 0 or X OS—16 s or X OS—16 µs—TA or X OS—25 µs—TA, where X equals to an integer number.

The UL transmission is UL transmission allocated within a multi-TTI transmission that includes at least UL transmission ending not before the idle period of the FFPu.

The UL transmission is UL transmission with repetitions that includes at least one repetition ending not before the idle period of the FFPu.

Determination of a COT Initiator for UL Transmission Aligned with the Start Boundary of an FFPu The following implementations may be applied for a scenario where more than one FFPu (e.g., FFPu #1 and FFPu #2) overlap an FFPg (e.g., FFPg #1), the end boundary of the idle period of a first FFPu (e.g., FFPu #1) is aligned with the start boundary of a second FFPu (e.g., FFPu #2), and the start boundary of the second FFPu is after the start boundary of the FFPg.

In some implementations, when the start symbol of a UL transmission is aligned with the start boundary of the second FFPu and the UL transmission ends before the idle period of the second FFPu, and when an indication of whether a UE should transmit the UL transmission based on the second FFPu is not explicitly configured or indicated, the UE may determine that the UL transmission is transmitted based on the FFPg if the UL transmission starts after the start boundary of the FFPg and ends before the idle period of the FFPg, and if at least one of the following conditions is satisfied.

The UE detects a DL signal in the FFPg, and the DL signal is not UE-specific DCI for the UE.

The UE detects a DL signal in the FFPg, and the UE did not initiate the first FFPu.

The UE detects a DCI format 20 indicating the remaining channel occupancy duration ends in or after the first symbol that is included in the second FFPu.

CP extension of the UL transmission is not the same as the CP extension configured or indicated for UL transmission transmitted based on an FFPu with start symbol aligned with the start boundary of the second FFPu.

The UL transmission is UL transmission allocated within a multi-TTI transmission that includes at least UL transmission ending not before the idle period of the second FFPu.

Another UL transmission with start boundary aligned with the start boundary of the second FFPu is explicitly configured or indicated to be transmitted based on the FFPg, and the UL transmission is determined to be transmitted after performing UL grant overriding or logical channel prioritization for the UL transmission and the other UL transmission (e.g., as specified in Rel-15 and Rel-16 NR).

There is no other configured UL transmission with start boundary aligned with the start boundary of the second FFPu and ends not before the idle period of the FFPg.

The UL transmission is an UL transmission allocated within a multi-TTI transmission that includes at least UL transmission ending not before the idle period of the second FFPu.

The UL transmission is UL transmission with repetitions that include at least one repetition ending not before the idle period of the FFPu.

The UL transmission is associated with another UL transmission ending not before the idle period of the FFPu. For example, the UL transmission is a DG PUSCH and the other transmission is an SRS triggered by the DCI scheduling the DG PUSCH. For another example, the UL transmission is a PRACH preamble and the other UL transmission is a PUSCH associated with the PRACH preamble for MsgA.

In some other implementations, the UE may determine that the UL transmission is transmitted based on the second FFPu if at least one of the following conditions is satisfied.

The UE does not detects a DL signal in the FFPg, or the UE only detects UE-specific DCI for the UE.

The UE initiated the first FFPu, and does not detect a DL signal or the UE only detects UE-specific DCI after the UE has initiated the first FFPu.

The UE detects a DCI format 2_0 indicating the remaining channel occupancy duration ends before the first symbol that is included in the second FFPu.

CP extension of the UL transmission is the same as the CP extension configured or indicated for UL transmission transmitted based on an FFPu with start symbol aligned with the start boundary of the second FFPu.

The UL transmission is not UL transmission allocated within a multi-TTI transmission that includes at least UL transmission ending not before the idle period of the second FFPu.

Another UL transmission with start boundary aligned with the start boundary of the second FFPu is explicitly configured or indicated to be transmitted based on the second FFPu, and the UL transmission is determined to be transmitted after performing UL grant overriding or logical channel prioritization for the UL transmission and the other UL transmission (e.g., as specified in Rel-15 and Rel-16 NR).

There is another configured UL transmission with start boundary aligned with the start boundary of the second FFPu and ends not before the idle period of the FFPg.

The UL transmission is not UL transmission allocated within a multi-TTI transmission that includes at least UL transmission ending not before the idle period of the second FFPu.

The UL transmission is not UL transmission with repetitions that include at least one repetition ending not before the idle period of the second FFPu.

The UL transmission is not associated with another UL transmission ending not before the idle period of the second FFPu.

The symbols including the UL transmission are indicated as UL by configuration(s) (e.g., tdd-UL-DL-ConfigurationCommon and tdd-UL-DL-ConfigurationDedicated), or the symbols are indicated as flexible by the configuration(s) (e.g., tdd-UL-DL-ConfigurationCommon and tdd-UL-DL-ConfigurationDedicated) or are indicated as UL by a DCI format 2_0.

In some implementations, when the start symbol of a UL transmission is aligned with the start boundary of the second FFPu and the UL transmission ends before the idle period of the second FFPu, and when the UL transmission is determined by the UE to be transmitted based on the second FFPu, and when the UE determines (or assesses) the channel as not clear after performing a CCA, the UE may transmit the UL transmission based on the FFPg if the UL transmission starts after the start boundary of the FFPg and ends before the idle period of the FFPg, if the above condition(s) is satisfied, and if the following condition is satisfied.

The gap between the end of DL transmission and the start of the UL transmission is at most 16 μs.

UL Transmission Following a CG PUSCH

Implementations for addressing the above issues may be as follows.

A UE may drop at least one symbol of the last symbols of a CG PUSCH when/if the following conditions (a)-(e) are all satisfied.

(a) the CG PUSCH ends in a symbol (e.g., symbol n–1),
(b) the scheduled UL transmission starts at a following symbol (e.g., symbol n),
(c) the start symbol of the CG PUSCH is aligned with the start boundary of an FFPu,
(d) the UE has initiated the FFPu by transmission of the CG PUSCH, and
(e) the scheduled UL transmission is configured or indicated to be transmitted based on an FFPg.

In some implementations, the UE may cancel (transmission of) the CG PUSCH. In some implementations, the UE may not expect to be scheduled with the UL transmission satisfying the above conditions or the UE may ignore the UL grant of the UL transmission satisfying the above conditions.

Figure 2:
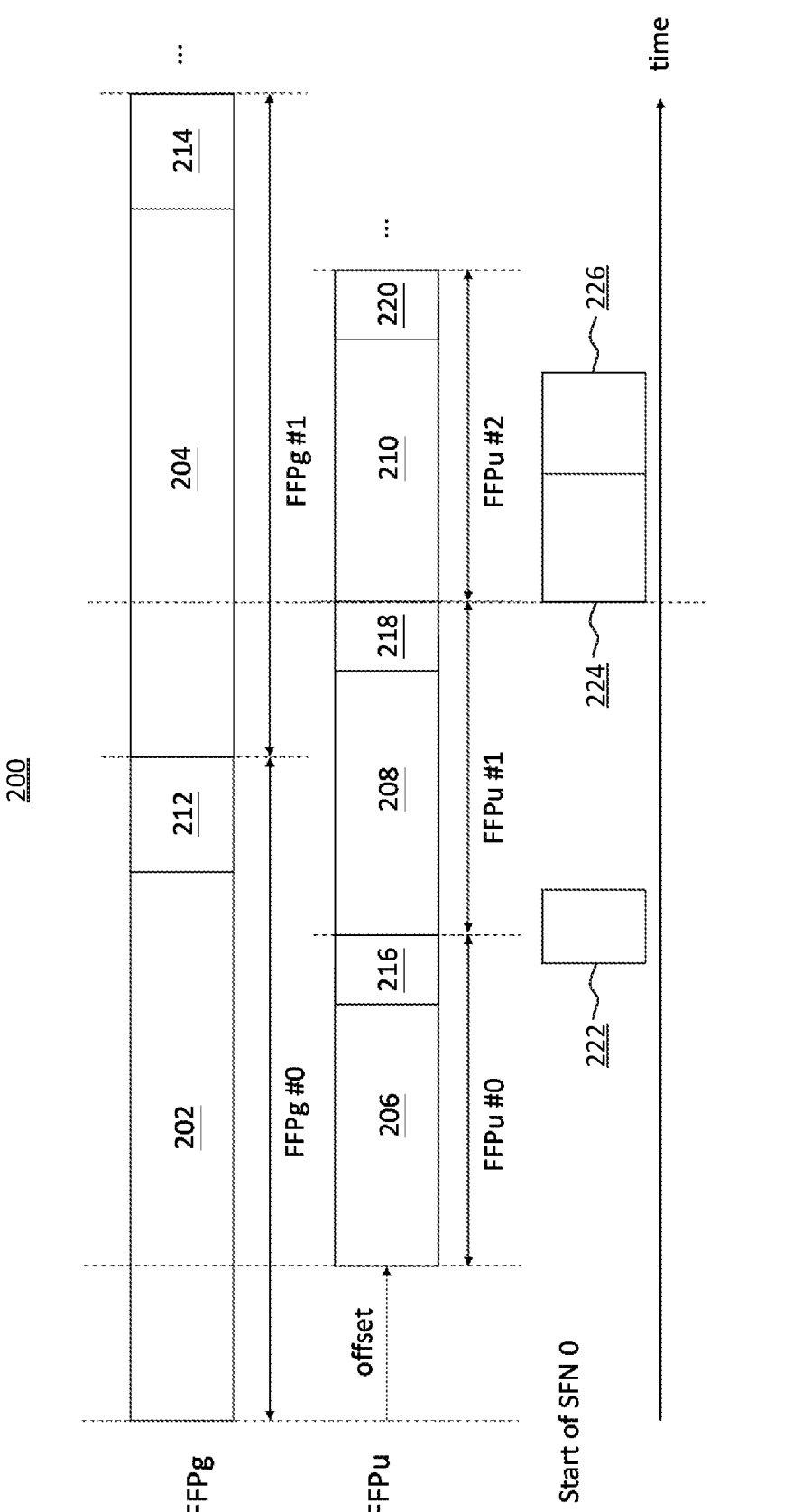
FIG. 2 is a timing diagram illustrating a UL transmission following a configured grant (CG) PUSCH, according to an example implementation of the present disclosure.

FIG. 2 is a timing diagram 200 illustrating a UL transmission following a CG PUSCH, according to an example implementation of the present disclosure. As shown in FIG. 2, FFPg #0 includes two time periods 202 and 212. The time periods 202 and 212 may indicate (or represent) a COT and an idle period of FFPg #0, respectively. The time period 202 may include a communication period (e.g., for transmitting data). The time period 212 may include a sensing period (e.g., for performing CCA). Similarly, FFPg #1 includes two time periods 204 and 214. The time periods 204 and 214 may indicate (or represent) a COT and an idle period of the FFPg #1, respectively. The time period 204 may include a communication period (e.g., for transmitting data). The time period 214 may include a sensing period (e.g., for performing CCA).

In addition, FFPu #0 includes two time periods 206 and 216. The time periods 206 and 216 may indicate (or represent) a COT and an idle period of FFPu #0, respectively. The time period 206 may include a communication period (e.g., for transmitting data). The time period 216 may include a sensing period (e.g., for performing CCA). FFPu #1 includes two time periods 208 and 218. Similarly, FFPu #1 includes two time periods 208 and 218. The time periods 208 and 218 may indicate (or represent) a COT and an idle period of FFPu #1, respectively. The time period 208 may include a communication period (e.g., for transmitting data). The time period 218 may include a sensing period (e.g., for performing CCA). FFPu #2 includes two time periods 210 and 220. The time periods 210 and 220 may indicate (or represent) a COT and an idle period of FFPu #2, respectively. The time period 210 may include a communication period (e.g., for transmitting data). The time period 220 may include a sensing period (e.g., for performing CCA). It should be noted that the length and the number of FFPs are not limited herein.

As shown in FIG. 2, there are DCI 222, CG PUSCH 224, and (scheduled) UL transmission (e.g., DG PUSCH) 226. The start time of the UL transmission 226 may be immediately after the start time of CG PUSCH 224. For example, CG PUSCH 224 may end in symbol n–1 and UL transmission 226 may start at symbol n. The start time of CG PUSCH 224 may be aligned with the start boundary of FFPu #2. A UE may initiate FFPu #2 by transmitting CG PUSCH 224. DCI 222 may be received within the time period 202 of FFPg #0 or the time period 208 of FFPu #1. The end time of CG PUSCH 224 may be before the start time of the time period 220 of FFPu #2 and the start time of the time period 214 of FFPg #1. There may be no DL signal within FFPg #1 before the start time of CG PUSCH 224.

Cross-FFP Scheduling

The following implementations may be applied for a scenario in which a first FFPu (e.g., FFPu #2) starts after the start boundary of a first FFPg (e.g., FFPg #1), the end boundary of an idle period of a second FFPu (e.g., FFPu #1) is aligned with the start boundary of the first FFPu, and the end boundary of an idle period of a second FFPg (e.g., FFPg #0) is aligned with the start boundary of the first FFPg.

In some implementations, a UE may transmit a UL transmission based on a first FFPu when/if the following conditions (a)-(d) are all satisfied.

(a) the UE receives the DCI in a second FFPg (e.g., FFPg #0) scheduling the UL transmission that starts after the start boundary of a first FFPg (e.g., FFPg #1) and ends before an idle period of the first FFPu (e.g., FFPu #2),
(b) the UL transmission is explicitly configured or indicated to be transmitted based on the first FFPg,
(c) the UE determines that a gNB did not initiate the first FFPg,
(d) the start symbol of the UL transmission is aligned with the start boundary of the first FFPu.

The UE may determine that the gNB has initiated the first FFPg if a DL signal is detected in the first FFPg. The UE may determine that the gNB has initiated the first FFPg if a DL signal other than UE-specific DCI is detected in the first FFPg and the UE has initiated a second FFPu (e.g., FFPu #1).

PUSCH Repetition Type B

Implementations that perform segmentation for a PUSCH, with PUSCH repetition type B, are described below.

When at least one of the following conditions is satisfied, a UE may perform segmentation based on the above implementation(s) (e.g., the implementations applicable for a scenario where an FFPu overlaps more than one FFPg and the end boundary of the idle period of a first FFPg is aligned with the start boundary of a second FFPg).

The total length of the PUSCH with a PUSCH repetition type B results in the last symbol of the last nominal repetition not being in the same FFPg as the FFPg in which the first symbol of the first nominal repetition is located.

The PUSCH with a PUSCH repetition type B is determined to be transmitted based at least on an FFPu (e.g., configured or indicated to be transmitted based on the FFPu including the first symbol of the first nominal repetition).

In some other implementations, when at least one of the following conditions is satisfied, a UE may perform segmentation based on the above implementation(s) (e.g., the implementations applicable for a scenario where more than one FFPu overlap an FFPg, the end boundary of the idle period of a first FFPu is aligned with the start boundary of a second FFPu, and the start boundary of the second FFPu is after the start boundary of the FFPg).

The total length of the PUSCH with a PUSCH repetition type B results in the last symbol of the last nominal repetition being in the same FFPg as the FFPg in which the first symbol of the first nominal repetition is located.

The PUSCH with a PUSCH repetition type B is determined to be transmitted based at least on an FFPg (e.g., configured or indicated to be transmitted based on the FFPg) including the first symbol of the first nominal repetition.

Determination of UL Transmission Based on an FFPg or an FFPu

The following implementations may be applied for a scenario where an FFPu (e.g., FFPu #1) overlaps more than one FFPg (e.g., FFPg #0 and FFPg #1) and the end boundary of the idle period of a first FFPg (e.g., FFPg #0) is aligned with the start boundary of a second FFPg (e.g., FFPg #1).

When a UE has initiated the FFPu, if there is a UL transmission that starts after the start boundary of the second FFPg and ends before the idle period of the FFPu, the UE may determine that the UL transmission is transmitted based on the FFPu if at least one of the following conditions is satisfied.

The UE detects a DL signal in the idle period of the first FFPg.

The UE receives a response from a gNB in the FFPu (e.g., UE-specific DCI or group common DCI including information dedicated for the UE).

The UE does not detect a DL signal in the second FFPg.

The start symbol of the UL transmission is a number of symbols that is smaller than a time duration relative to the first symbol that contains in the second FFPg. The time duration may be configurable or may be a time duration for a processing that depends on the UE capability (e.g., $T_{proc,2}$).

The start symbol of the UL transmission is a number of symbols that is smaller than a time duration relative to a last symbol of a CORESET (e.g., in which the UE detects a DCI format 2_0 that including an indication of a remaining channel occupancy duration). The time duration may be configurable or may be a time duration for a processing that depends on the UE capability (e.g., $T_{proc,2}$).

The UE detects a DCI format 2_0 indicating the remaining channel occupancy duration ends before or in the last symbol of the CORESET where the UE detected the DCI format 2_0.

The first symbol that included in the second FFPg is indicated as UL or flexible by configuration(s) (e.g., tdd-UL-DL-ConfigurationCommon and tdd-UL-DL-ConfigurationDedicated), or indicated as UL by a DCI format 2_0.

CP extension of the UL transmission is configured or indicated as 0 or X OFDM symbols (OS)—16 μs or X OS—16 μs—TA, where X equals to an integer number.

The UL transmission is not UL transmission allocated within a multi-TTI transmission that includes at least UL transmission ending not before the idle period of the FFPu.

The UL transmission is not UL transmission with repetitions that includes at least one repetition ending not before the idle period of the FFPu.

In some other implementations, the UE may determine that the UL transmission is transmitted based on the second FFPg if at least one of the following conditions is satisfied.

The UE does not detect a DL signal in the idle period of the first FFPg.

The UE detects a DL signal in the second FFPg.

The UE does not receive a response from a gNB in the FFPu (e.g., UE-specific DCI or group common DCI including information dedicated for the UE).

The UE detects a DCI format 2_0 indicating the remaining channel occupancy duration ends after the last symbol of the CORESET where the UE detected the DCI format 2_0.

The first symbol that included in the second FFPg is indicated as DL or flexible by configuration(s) (e.g., tdd-UL-DL-ConfigurationCommon and tdd-UL-DL-ConfigurationDedicated), or indicated as DL by a DCI format 2_0.

CP extension of the UL transmission is configured or indicated as 0 or X OS—16 s or X OS—16 μs—TA or X OS—25 μs—TA, where X equals to an integer number.

The UL transmission is UL transmission allocated within a multi-TTI transmission that includes at least UL transmission ending not before the idle period of the FFPu.

The UL transmission is UL transmission with repetitions that includes at least one repetition ending not before the idle period of the FFPu.

Determination of a COT Initiator for UL Transmission Aligned with the Start Boundary of an FFPu The following implementations may be applied for a scenario where more than one FFPu (e.g., FFPu #1 and FFPu #2) overlap an FFPg (e.g., FFPg #1), the end boundary of the idle period of a first FFPu (e.g., FFPu #1) is aligned with the start boundary of a second FFPu (e.g., FFPu #2), and the start boundary of the second FFPu is after the start boundary of the FFPg.

In some implementations, when the start symbol of a UL transmission is aligned with the start boundary of the second FFPu and the UL transmission ends before the idle period of the second FFPu, and when an indication of whether a UE should transmit the UL transmission based on the second FFPu is not explicitly configured or indicated, the UE may determine that the UL transmission is transmitted based on the FFPg if the UL transmission starts after the start boundary of the FFPg and ends before the idle period of the FFPg, and if at least one of the following conditions is satisfied.

The UE detects a DL signal in the FFPg, and the DL signal is not UE-specific DCI for the UE.

The UE detects a DL signal in the FFPg, and the UE did not initiate the first FFPu.

The UE detects a DCI format 20 indicating the remaining channel occupancy duration ends in or after the first symbol that is included in the second FFPu.

CP extension of the UL transmission is not the same as the CP extension configured or indicated for UL transmission transmitted based on an FFPu with start symbol aligned with the start boundary of the second FFPu.

The UL transmission is UL transmission allocated within a multi-TTI transmission that includes at least UL transmission ending not before the idle period of the second FFPu.

Another UL transmission with start boundary aligned with the start boundary of the second FFPu is explicitly configured or indicated to be transmitted based on the FFPg, and the UL transmission is determined to be transmitted after performing UL grant overriding or logical channel prioritization for the UL transmission and the other UL transmission (e.g., as specified in Rel-15 and Rel-16 NR).

There is no other configured UL transmission with start boundary aligned with the start boundary of the second FFPu and ends not before the idle period of the FFPg.

The UL transmission is an UL transmission allocated within a multi-TTI transmission that includes at least UL transmission ending not before the idle period of the second FFPu.

The UL transmission is UL transmission with repetitions that include at least one repetition ending not before the idle period of the FFPu.

The UL transmission is associated with another UL transmission ending not before the idle period of the FFPu. For example, the UL transmission is a DG PUSCH and the other transmission is an SRS triggered by the DCI scheduling the DG PUSCH. For another example, the UL transmission is a PRACH preamble and the other UL transmission is a PUSCH associated with the PRACH preamble for MsgA.

In some other implementations, the UE may determine that the UL transmission is transmitted based on the second FFPu if at least one of the following conditions is satisfied.

The UE does not detects a DL signal in the FFPg, or the UE only detects UE-specific DCI for the UE.

The UE initiated the first FFPu, and does not detect a DL signal or the UE only detects UE-specific DCI after the UE has initiated the first FFPu.

The UE detects a DCI format 2_0 indicating the remaining channel occupancy duration ends before the first symbol that is included in the second FFPu.

CP extension of the UL transmission is the same as the CP extension configured or indicated for UL transmission transmitted based on an FFPu with start symbol aligned with the start boundary of the second FFPu.

The UL transmission is not UL transmission allocated within a multi-TTI transmission that includes at least UL transmission ending not before the idle period of the second FFPu.

Another UL transmission with start boundary aligned with the start boundary of the second FFPu is explicitly configured or indicated to be transmitted based on the second FFPu, and the UL transmission is determined to be transmitted after performing UL grant overriding or logical channel prioritization for the UL transmission and the other UL transmission (e.g., as specified in Rel-15 and Rel-16 NR).

There is another configured UL transmission with start boundary aligned with the start boundary of the second FFPu and ends not before the idle period of the FFPg.

The UL transmission is not UL transmission allocated within a multi-TTI transmission that includes at least UL transmission ending not before the idle period of the second FFPu.

The UL transmission is not UL transmission with repetitions that include at least one repetition ending not before the idle period of the second FFPu.

The UL transmission is not associated with another UL transmission ending not before the idle period of the second FFPu.

The symbols including the UL transmission are indicated as UL by configuration(s) (e.g., tdd-UL-DL-Configuration-Common and tdd-UL-DL-ConfigurationDedicated), or the symbols are indicated as flexible by the configuration(s) (e.g., tdd-UL-DL-ConfigurationCommon and tdd-UL-DL-ConfigurationDedicated) or are indicated as UL by a DCI format 2_0.

In some implementations, to avoid ambiguity of a COT initiator, the UE may not expect to be configured with another configured UL transmission with a start boundary that is aligned with the start boundary of the second FFPu that ends not before the idle period of the FFPg.

In some implementations, to avoid ambiguity of a COT initiator, the UE may not expect to be configured or scheduled with another UL transmission that ends not before the idle period of the second FFPu that is associated with the UL transmission.

In some implementations, the UE does not initiate an FFPu if the TA is updated more than once every 200 ms. It should be noted that the TA may affect the starting position of the one or more FFPus initiated by the UE. The TA should not be changed more than once every 200 ms according to the regulations of the FBE operation.

In some implementations, when the start symbol of a UL transmission is aligned with the start boundary of the second FFPu and the UL transmission ends before the idle period of the second FFPu, and when the UL transmission is determined by the UE to be transmitted based on the second FFPu, and when the UE determines (or assesses) the channel as not clear after performing a CCA, the UE may transmit the UL transmission based on the FFPg if the UL transmission starts after the start boundary of the FFPg and ends before the idle period of the FFPg, if the above condition(s) is satisfied, and if the following condition is satisfied.

The gap between the end of DL transmission and the start of the UL transmission is at most 16 μs.

In some implementations, the condition may be checked by the duration of CP extension configured or indicated for the UL transmission. For example, the UE may determine that the gap is at most 16 μs if the duration of CP extension equals to X OS—16 μs or X OS—16 μs—TA, where X equals to an integer number.

UL Transmission Following a CG PUSCH

Implementations for addressing the above issues may be as follows.

When a CG PUSCH ends in a symbol (e.g., symbol n−1), scheduled a UL transmission starts at a following symbol (e.g., symbol n), and the start symbol of the CG PUSCH is aligned with the start boundary of an FFPu, and a UE has initiated the FFPu by transmission of the CG PUSCH, the UE may drop at least one symbol of the last symbols of the CG PUSCH if the scheduled UL transmission is configured or indicated to be transmitted based on an FFPg. In some implementations, the UE may cancel (the transmission of) the CG PUSCH. In some implementations, the UE may not expect to be scheduled with the UL transmission satisfying the above conditions or the UE may ignore the UL grant of the UL transmission satisfying the above conditions.

In some other implementations, when the start symbol of the scheduled UL transmission is aligned with the start boundary of an FFPu and a UE has started to transmit a CG PUSCH earlier than the scheduled UL transmission based on an FFPg, if the UE is configured or indicated to initiate the FFPu and if the CG PUSCH overlaps an idle period of a last FFPu before the FFPu, the UE may drop the last symbols of the CG PUSCH that overlap the idle period (e.g., of the last FFPu before the FFPu, or the FFPu). In some implementations, the UE may cancel (the transmission of) the CG PUSCH. In some implementations, the UE may not expect to be scheduled with the UL transmission based on the FFPu if the UE is configured with the CG PUSCH overlapping the idle period of the last FFPu before the FFPu. In some implementations, the UE may not expect to be configured with the CG PUSCH overlapping the idle period of the FFPu.

In some other implementations, when a CG PUSCH includes symbols indicated as flexible by the configurations (e.g., tdd-UL-DL-ConfigurationCommon and tdd-UL-DL-ConfigurationDedicated), or when the configurations (e.g., tdd-UL-DL-ConfigurationCommon and tdd-UL-DL-ConfigurationDedicated) are not provided to a UE, and the symbols are after a number of symbols that is smaller than the PUSCH preparation time $T_{proc,2}$ for the corresponding PUSCH processing capability related to a last symbol of a CORESET (e.g., in which the UE detects a DCI format 2_0 indicating at least one of the symbols as DL or flexible), if the start symbol of the CG PUSCH is aligned with the start boundary of an FFPu and if the UE has initiated the FFPu by transmission of the CG PUSCH, the UE may transmit the UL transmission following (e.g., immediately after) the CG PUSCH based on an FFPg. In some implementations, if the UL transmission does not end before an idle period of the FFPg, the UE may not transmit the UL transmission.

Cross-FFP Scheduling

The following implementations may be applied for a scenario in which a first FFPu (e.g., FFPu #2) starts after the start boundary of a first FFPg (e.g., FFPg #1), the end boundary of an idle period of a second FFPu (e.g., FFPu #1) is aligned with the start boundary of the first FFPu, and the end boundary of an idle period of a second FFPg (e.g., FFPg #0) is aligned with the start boundary of the first FFPg.

In some implementations, when a UE receives the DCI in the second FFPg scheduling the UL transmission that starts after the start boundary of the first FFPg and ends before an idle period of the first FFPu and when the UL transmission is explicitly configured or indicated to be transmitted based on the first FFPg, the UE may transmit the UL transmission based on the first FFPu if the UE determines that a gNB did not initiate the first FFPg, and if the start symbol of the UL transmission is aligned with the start boundary of the first FFPu. The UE may determine that the gNB has initiated the first FFPg if a DL signal is detected in the first FFPg or the UE may determine that the gNB has initiated the first FFPg if a DL signal other than the UE-specific DCI is detected in the first FFPg when the UE has initiated the second FFPu.

In some implementations, the UE may transmit the UL transmission based on the first FFPu if the UE determines that the gNB did not initiate the first FFPg and the UE has initiated the first FFPu by transmitting another UL transmission, and if the start symbol of the UL transmission is after the end symbol of the other UL transmission. Otherwise, the UE may not transmit the UL transmission.

In some implementations, to avoid ambiguity of a COT initiator, the UE may not expect to be scheduled with the UL transmission to be transmitted based on the first FFPg and overlapping another UL transmission with the start symbol aligned with the start boundary of the first FFPu. In some implementations, the above implementation may be applicable when a specific IE (e.g., lch-basedPrioritization) is configured.

In some implementations, the UE may not transmit the UL transmission based on the first FFPu if the CP extension of the UL transmission is not the same as the CP extension configured or indicated for the UL transmission transmitted based on an FFPu with the start symbol aligned with the start boundary of the FFPu.

In some implementations, to avoid ambiguity of a COT initiator, the UE may not expect to be scheduled with a UL transmission with the start symbol aligned with the start boundary of the first FFPu.

In some implementations, to avoid ambiguity of a COT initiator, the UE may not expect to be scheduled with a UL transmission with the start symbol that is a number of symbols smaller than a time duration related to the first symbol that included in the first FFPu. The time duration may be configurable or may be a time duration for a processing that depends on the UE capability (e.g., $T_{proc,2}$), if the start symbol is aligned with the start boundary of the first FFPu.

In some implementations, to avoid ambiguity of a COT initiator, the UE may not expect to be scheduled with the UL transmission with the start symbol that is a number of symbols smaller than a time duration relative to a last symbol of a CORESET (e.g., in which the UE detects a DCI format 2_0 that includes an indication of a remaining channel occupancy duration). The time duration may be configurable or may be a time duration for a processing that depends on the UE capability (e.g., $T_{proc,2}$), if the start symbol is aligned with the start boundary of the first FFPu.

PUSCH Repetition Type B

Implementations for performing segmentation for a PUSCH with a PUSCH repetition type B may be as follows.

When at least one of the following conditions is satisfied, a UE may perform segmentation based on the above implementation(s) (e.g., the implementations applicable for a scenario where an FFPu overlaps more than one FFPg and the end boundary of the idle period of a first FFPg is aligned with the start boundary of a second FFPg).

The total length of the PUSCH with the PUSCH repetition type B may result in the last symbol of the last nominal repetition not being in the same FFPg as the FFPg in which the first symbol of the first nominal repetition is located.

The PUSCH with the PUSCH repetition type B is determined to be transmitted based at least on an FFPu (e.g., configured or indicated to be transmitted based on the FFPu including the first symbol of the first nominal repetition).

In some other implementations, when at least one of the following conditions is satisfied, a UE may perform segmentation based on the above implementation(s) (e.g., the implementations applicable for a scenario where more than one FFPu overlap an FFPg, the end boundary of the idle period of a first FFPu is aligned with the start boundary of a second FFPu, and the start boundary of the second FFPu is after the start boundary of the FFPg).

The total length of the PUSCH with the PUSCH repetition type B results in the last symbol of the last nominal repetition being in the same FFPg as the FFPg in which the first symbol of the first nominal repetition is located.

The PUSCH with the PUSCH repetition type B is determined to be transmitted based at least on an FFPg (e.g., configured or indicated to be transmitted based on the FFPg) including the first symbol of the first nominal repetition.

The following implementations may be applied for (or combined with) the implementation applicable for a scenario where an FFPu overlaps more than one FFPg and the end boundary of the idle period of a first FFPg is aligned with the start boundary of a second FFPg.

In some other implementations, the UE may segment a nominal repetition within an idle period of the FFPu if the nominal repetition overlaps the idle period.

In some other implementations, the UE may segment a nominal repetition within the invalid symbols indicated by a first invalid symbol pattern configured by a gNB if the nominal repetition overlaps the invalid symbols.

In some other implementations, the UE may segment a nominal repetition within an idle period of the FFPu or around the invalid symbols indicated by a first invalid symbol pattern configured by a gNB if the nominal repetition overlaps the idle period or the invalid symbols.

The following implementations may be applied for (or combined with) the implementation applicable for a scenario where more than one FFPu overlap an FFPg, the end boundary of the idle period of a first FFPu is aligned with the start boundary of a second FFPu, and the start boundary of the second FFPu is after the start boundary of the FFPg.

In some other implementations, the UE may segment a nominal repetition within an idle period of the FFPg if the nominal repetition overlaps the idle period.

In some other implementations, the UE may segment a nominal repetition within an idle period of the FFPg or within a number of symbols after the idle period of the FFPg that may be configurable or may be equal to or larger than a time duration for a processing that depends on the UE capability (e.g., $T_{proc,2}$), if the nominal repetition overlaps the idle period or the number of symbols.

In some other implementations, the UE may segment a nominal repetition within the invalid symbols indicated by a second invalid symbol pattern configured by a gNB if the nominal repetition overlaps the invalid symbols.

In some other implementations, the UE may segment a nominal repetition within an idle period of the FFPg or within the invalid symbols indicated by a second invalid symbol pattern configured by a gNB if the nominal repetition overlaps the idle period or the invalid symbols.

In some other implementations, the UE may segment a nominal repetition within an idle period of the FFPg or within a number of symbols after the idle period of the FFPg that may be configurable or may be equal to or larger than a time duration for a processing that depends on the UE capability (e.g., $T_{proc,2}$), or may segment the nominal repetition within the invalid symbols indicated by a second invalid symbol pattern configured by the gNB if the nominal repetition overlaps one of the idle period, the number of symbols, and the invalid symbols.

The following implementations may be applied for performing the transmission of the actual repetitions after the segmentation is performed.

In some other implementations, a UE may initiate an FFPu by transmitting an actual repetition if the start symbol of the actual repetition is aligned with the start boundary of the FFPu.

In some other implementations, an actual repetition overlapping an idle period of an FFPu is not transmitted if the actual repetition overlaps the idle period of the FFPu and if a UE initiated the FFPu.

In some other implementations, an actual repetition overlapping the idle period of an FFPu may not be transmitted if the actual repetition overlaps the idle period of the FFPu and if a UE determines to initiate another FFPu (immediately) after the FFPu, where the start boundary of the other FFPu may be aligned with the end of the idle period of the FFPu. Determination of whether to initiate another FFPu may be based on an indication of whether the UE should initiate the other FFPu or based on an indication of whether a gNB will initiate an FFPg overlapping the other FFPu (e.g., since the UE may not initiate the FFPu if the gNB initiates the FFPg). In some implementations, the determination of whether to initiate another FFPu may be based on the implementations applicable for a scenario where more than one FFPu overlap an FFPg, the end boundary of the idle period of a first FFPu is aligned with the start boundary of a second FFPu, and the start boundary of the second FFPu is after the start boundary of the FFPg.

In some other implementations, an actual repetition overlapping the idle period of an FFPg may not be transmitted if the actual repetition overlaps the idle period of the FFPg and if a UE does not initiate an FFPu including the symbols of the actual repetition, and the FFPu overlaps the idle period of the FFPg.

In some other implementations, an actual repetition overlapping the idle period of an FFPg or with a number of symbols after the idle period of the FFPg that may be configurable or may be equal to or larger than a time duration for a processing that depends on the UE capability (e.g., $T_{proc,2}$) may not be transmitted if the actual repetition overlaps the idle period of the FFPg or with the number of symbols and if a UE did not initiate an FFPu including the symbols of the actual repetition or the number of symbols, and the FFPu overlaps the idle period of the FFPg or with the number of symbols.

CP Extension

The following implementations may be applied for configuring a CP extension for a configured UL transmission(s). The implementations may achieve at least the following benefits. For example, the implementations may align the start positions of multiple UEs, which may result in avoiding mutual blocking of the UEs. The implementations may ensure the start boundary of one or more FFPu initiated by a UE is at the time position(s) that may be derived by the start position and a periodicity, which may satisfy the regulations of the FBE operation that the UE should not change the FFPu more than once every 200 ms.

It should be noted that an RB set may include all the RBs for which a single LBT is required.

In some implementations, for a configured UL transmission which may be used for initiating an FFPu (e.g., CG PUSCH with the start symbol aligned with the start boundary of the FFPu) and (associate) with the FDRA on fewer than all the RBs of an RB set, a first parameter (e.g., cg-StartingPartialBW-OutsideCOT) may be used to configure a CP extension for the configured UL transmission for a UE.

In some implementations, for configured UL transmission which may be used for initiating an FFPu (e.g., CG PUSCH with the start symbol aligned with the start boundary of the FFPu) and (associate) with the FDRA on all the RBs of an RB set, a first parameter (e.g., cg-StartingPartialBW-OutsideCOT) may be used to configure a CP extension for the configured UL transmission for a UE.

Issues regarding the FBE operation (e.g., for IIoT) in an unlicensed band may be as follows.

Gap Duration for a UE to Initiate an FFPu

According to the regulation of the FBE operation, if a UE initiates a first FFPu, the UE may not transmit a UL signal in an idle period of the first FFPu. Whether it is allowed for the UE to transmit the UL signal in an idle period of a second FFPu right before the first FFPu that the UE is going to initiate may need to be addressed. Whether it is allowed for a gNB to transmit a DL signal in the idle period of the second FFPu right before the first FFPu that the UE is going to initiate may need to be addressed. If it is not allowed, how to handle the gap between the end of the DL signal and the start of the first FFPu may need to be addressed.

Uplink Transmission in an Idle Period of an FFPg

A UE may be configured or scheduled with a UL transmission in an FFPu (e.g., FFPu #1) that overlaps more than one FFPg (e.g., FFPg #0 and FFPg #1). If the UL transmission overlaps an idle period of a first FFPg (e.g., FFPg #0), a gNB may not (be able to) initiate a second FFPg (e.g., FFPg #1) which starts immediately after the idle period of the first FFPg, since the gNB may not assess the channel to be clear when a CCA is performed due to the UL transmission from the UE. According to the regulation for the FBE operation, when the UE has initiated the FFPu, the gNB may not transmit the DL data to another UE in the FFPu. Therefore, it may be beneficial to allow the gNB to initiate the second FFPg when there is urgent DL data for another UE, so that the gNB may schedule the DL data to the other UE in the second FFPg. Otherwise, the gNB may (have to) wait until a third FFPg (e.g., FFPg #2 not illustrated in FIGS. 1 and 2) (e.g., which starts immediately after the idle period of the second FFPg) to schedule the DL data. Implementations for handling the UL transmission overlapping an idle period of an FFPg may be needed to allow a gNB to initiate a next FFPg after the FFPg.

CP Extension

A CP extension may be used to create a gap between the end of the DL transmission by a gNB and the start of the UL transmission by a UE, or between the end of first UL transmission and the start of second UL transmission. According to the regulation of the FBE operation, for the UL transmission transmitted based on an FFPg, the UE may need to perform a CCA and assess a channel to be idle for at least a sensing slot duration of 9 μs within a 25 s interval if the gap between the UL transmission and DL transmission is more than 16 μs. For the UL transmission transmitted based on an FFPu, the UE may need to perform a CCA and assess a channel to be idle for at least a sensing slot duration of 9 μs interval if the gap between the UL transmission and DL transmission is more than 16 μs. Since the duration of the gap may be different for the case where the UL transmission is transmitted based on the FFPg and for the case where the UL transmission is transmitted based on the FFPu, a configuration or indication of the CP extension may be different. Implementations for the configuration or indication of the CP extension may be needed.

Implementations for handling the above issues may be as follows.

Gap Duration for a UE to Initiate an FFPu

The following implementations may be applied for configuring or indicating a gap duration for a UE to initiate an FFPu.

In some implementations, for the configured UL transmission with the start symbol aligned with the start boundary of the FFPu, the UE may transmit the configured UL transmission based on the FFPu if there is no DL transmission overlapping the idle period of another FFPu earlier than the FFPu, where the end of the idle period of the other FFPu may be aligned with the start boundary of the FFPu. The UE may determine whether there is any DL transmission overlapping the idle period of the other FFPu based on the configuration of DL symbols. For example, the UE may determine that there is a DL transmission overlapping the idle period of the other FFPu if there are symbols overlapping the idle period of the other FFPu. The symbols may be indicated as DL by the configuration(s) (e.g., tdd-UL-DL-ConfigurationCommon and tdd-UL-DL-ConfigurationDedicated), or may be indicated as flexible by the configuration(s) (e.g., tdd-UL-DL-ConfigurationCommon and tdd-UL-DL-ConfigurationDedicated), or may be indicated as DL by a DCI format 2_0. In some implementations, the UE may determine that there is a DL transmission overlapping the idle period of the other FFPu if there are symbols overlapping the idle period of the other FFPu in which the DL transmission is transmitted to the UE (e.g., UE-specific DCI or group common DCI including information dedicated for the UE).

In some implementations, whether there are DL symbols overlapping the idle period of the other FFPu may be determined based on the gap duration between the end of the DL symbols and the start of the configured UL transmission. If the gap duration is less than the duration of the idle period of the FFPu, the UE may determine that there are DL symbols overlapping the idle period of the other FFPu.

In some implementations, for the configured UL transmission with the start symbol aligned with the start boundary of the FFPu, the UE may transmit the configured UL transmission based on the FFPu if there is no UL transmission overlapping the idle period of another FFPu earlier than the FFPu, where the end of the idle period of the other FFPu may be aligned with the start boundary of the FFPu, and the UL transmission may be another scheduled UL transmission or configured UL transmission configured or indicated by a gNB.

In some implementations, the UE may determine whether there is any UL transmission overlapping the idle period of the other FFPu based on the symbols including the other scheduled or configured UL transmission. For example, the UE may determine that there is UL transmission overlapping the idle period of the other FFPu if the symbols including the other scheduled or configured UL transmission overlap the idle period of the other FFPu.

In some implementations, whether the symbols including the other scheduled UL transmission or configured UL transmission overlap the idle period of the other FFPu may be determined based on the gap duration between the end of the symbols and the start of the configured UL transmission. If the gap duration is less than the duration of the idle period of the FFPu, the UE may determine that the symbols overlap the idle period of the other FFPu.

Uplink Transmission in an Idle Period of an FFPg

In some implementations, for a configured UL transmission transmitted based on an FFPu, if the end boundary of the last symbols including the configured UL transmission is within a time duration before the start boundary of an FFPg, the UE may transmit the configured UL transmission if the symbols are indicated as UL by the configuration(s) (e.g., tdd-UL-DL-ConfigurationCommon and tdd-UL-DL-ConfigurationDedicated), or if the symbols are indicated as flexible by the configuration(s) (e.g., tdd-UL-DL-ConfigurationCommon and tdd-UL-DL-ConfigurationDedicated) or are indicated as UL by a DCI format 2_0.

Implementations of determining the time duration may be as follows or may be configurable.

The time duration is 9 μs.

The time duration is 9 μs+T, where T is a configurable time duration that may be a positive or a negative value.

The time duration is the duration of the idle period of the FFPg.

The time duration is the duration of the idle period of the FFPg+T, where T is a configurable time duration that may be a positive or a negative value.

CP Extension

The following implementations may be applied for configuring a CP extension for a configured UL transmission(s). The implementations may achieve at least the following benefits. For example, the implementations may align the start positions of multiple UEs, which may avoid mutual blocking of the UEs. The implementations may ensure the start boundary of one or more FFPus initiated by a UE is at the time position(s) that may be derived by the start position and a periodicity, which may satisfy the regulation of the FBE operation that the UE should not change the FFPu more than once every 200 ms.

It should be noted that an RB set may include all the RBs for which a single LBT is required.

In some implementations, for a configured UL transmission which may be used for initiating an FFPu (e.g., CG PUSCH with the start symbol aligned with the start boundary of the FFPu) and (associate) with FDRA on fewer than all the RBs of an RB set, a first parameter (e.g., cg-StartingPartialBW-OutsideCOT) may be used to configure the CP extension for a UE to apply for the configured UL transmission when the configured UL transmission is transmitted based on the FFPu.

In some implementations, for the configured UL transmission which may be used for initiating an FFPu (e.g., CG PUSCH with the start symbol aligned with the start boundary of the FFPu) and (associate) with FDRA on all the RBs of an RB set, the first parameter may be used to configure the CP extension for a UE to apply for the configured UL transmission when the configured UL transmission is transmitted based on the FFPu.

In some implementations, for the configured UL transmission which may be transmitted based on an FFPg (e.g., CG PUSCH with the start symbol not aligned with the start boundary of an FFPu) and (associate) with FDRA on fewer than all the RBs of an RB set, a second parameter (e.g., cg-StartingPartialBW-Inside-gNBCOT) may be used to configure the CP extension for a UE to apply for the configured UL transmission when the configured UL transmission is transmitted based on the FFPg.

In some implementations, for the configured UL transmission which may be transmitted based on an FFPg (e.g., CG PUSCH with the start symbol not aligned with the start boundary of an FFPu) and (associate) with FDRA on all the RBs of an RB set, no CP extension may be applied for the configured UL transmission when the configured UL transmission is transmitted based on the FFPg.

In some implementations, for the configured UL transmission (associated) with FDRA on fewer than all the RBs of an RB set and with the start symbol not aligned with the start boundary of an FFPu that includes the configured UL transmission, a third parameter (e.g., cg-StartingPartialBW-Inside-UECOT) may be used to configure the CP extension for a UE to apply for the configured UL transmission when the configured UL transmission is transmitted based on the FFPu.

In some implementations, for the configured UL transmission (associated) with FDRA on all the RBs of an RB set and with the start symbol not aligned with the start boundary of an FFPu that includes the configured UL transmission, a UE may apply the CP extension configured by the third parameter or apply no CP extension for the configured UL transmission when the configured UL transmission is transmitted based on the FFPu.

Gap Duration for a UE to Initiate an FFPu

The following implementations may be applied for configuring or indicating a gap duration for a UE to initiate an FFPu.

In some implementations, for the configured UL transmission with the start symbol aligned with the start boundary of the FFPu, the UE may transmit the configured UL transmission based on the FFPu if there is no DL transmission overlapping the idle period of another FFPu earlier than the FFPu, where the end of the idle period of the other FFPu may be aligned with the start boundary of the FFPu. The UE may determine whether there is any DL transmission overlapping the idle period of the other FFPu based on the configuration of DL symbols. For example, the UE may determine that there is DL transmission overlapping the idle period of the other FFPu if there are symbols overlapping the idle period of the other FFPu. The symbols may be indicated as DL by the configuration(s) (e.g., tdd-UL-DL-ConfigurationCommon and tdd-UL-DL-ConfigurationDedicated), or indicated as flexible by the configuration(s) (e.g., tdd-UL-DL-ConfigurationCommon and tdd-UL-DL-ConfigurationDedicated) or indicated as DL by a DCI format 2_0. In some implementations, the UE may determine that there is a DL transmission overlapping the idle period of the other FFPu if there are symbols overlapping the idle period of the other FFPu in which DL transmission is transmitted to the UE (e.g., UE-specific DCI or group common DCI including information dedicated for the UE). In some implementations, the UE may determine there is a DL transmission overlapping the idle period of the other FFPu if there are one or more configured search space sets overlapping the idle period of the other FFPu.

In some implementations, whether there are DL symbols overlapping the idle period of the other FFPu may be determined based on the gap duration between the end of the DL symbols and the start of the configured UL transmission. If the gap duration is less than the duration of the idle period of the FFPu, the UE may determine that there are DL symbols overlapping the idle period of the other FFPu. Implementations of determining the gap duration may be as follows and may be configurable.

In some implementations, the gap duration may be determined by the duration of the number of symbols between the last symbol of the DL symbols and the first symbol of the configured UL transmission.

In some implementations, the gap duration may be determined by $L - TA$, where L is the duration of the number of symbols between the last symbol of the DL symbols and the first symbol of the configured UL transmission and TA is the duration of the timing advance.

In some implementations, the gap duration may be determined by $L - TA - CPE$, where L is the duration of the number of symbols between the last symbol of the DL symbols and the first symbol of the configured UL transmission and TA is the duration of the timing advance and CPE is the duration of the CP extension applied for transmitting the configured UL transmission based on the FFPu.

In some implementations, for the configured UL transmission with the start symbol aligned with the start boundary of the FFPu, the UE may transmit the configured UL transmission based on the FFPu if there is no UL transmission overlapping the idle period of another FFPu earlier than the FFPu, where the end of the idle period of the other FFPu may be aligned with the start boundary of the FFPu, and the UL transmission may be another scheduled UL transmission or configured UL transmission configured or indicated by a gNB.

In some implementations, the UE may determine whether there is any UL transmission overlapping the idle period of the other FFPu based on the symbols including the other scheduled or configured UL transmission. For example, the UE may determine that there is a UL transmission overlapping the idle period of the other FFPu if the symbols including the other scheduled or configured UL transmission overlap the idle period of the other FFPu.

In some implementations, whether the symbols including the other scheduled UL transmission or configured UL transmission overlap the idle period of the other FFPu may be determined based on the gap duration between the end of the symbols and the start of the configured UL transmission. If the gap duration is less than the duration of the idle period of the FFPu, the UE may determine that the symbols overlap the idle period of the other FFPu. Implementations of determining the gap duration may be as follows and may be configurable.

In some implementations, the gap duration may be determined by the duration of the number of symbols between the last symbol of the symbols including the other scheduled UL transmission or configured UL transmission and the first symbol of the configured UL transmission.

In some implementations, the gap duration may be determined by L–CPE, where L is the duration of the number of symbols between the last symbol of the symbols including the other scheduled UL transmission or configured UL transmission and the first symbol of the configured UL transmission and CPE is the duration of the CP extension applied for transmitting the configured UL transmission based on the FFPu.

In some implementations, the UE may drop the last symbols of a PUSCH or a PUCCH overlapping the idle period of the other FFPu if the UE is explicitly configured or indicated to initiate the FFPu by transmitting the configured UL transmission.

In some implementations, the UE may not expect to be explicitly configured or indicated to initiate the FFPu by transmitting the configured UL transmission if the UE is scheduled or configured with the other scheduled or configured UL transmission overlapping the idle period of the other FFPu.

Uplink Transmission in an Idle Period of an FFPg

In some implementations, for the configured UL transmission transmitted based on an FFPu, if the end boundary of the last symbols including the configured UL transmission are within a time duration before the start boundary of an FFPg, the UE may transmit the configured UL transmission if the symbols are indicated as UL by the configuration(s) (e.g., tdd-UL-DL-ConfigurationCommon and tdd-UL-DL-ConfigurationDedicated), or if the symbols are indicated as flexible by the configuration(s) (e.g., tdd-UL-DL-ConfigurationCommon and tdd-UL-DL-ConfigurationDedicated) or are indicated as UL by a DCI format 2_0.

Implementations of determining the time duration may be as follows or may be configurable.

The time duration is 9 μs.

The time duration is 9 μs+T, where T is a configurable time duration that may be a positive or a negative value.

The time duration is the duration of the idle period of the FFPg.

The time duration is the duration of the idle period of the FFPg+T, where T is a configurable time duration that may be a positive or a negative value.

In some implementations, configuration of T may be based on the difference of the TA (e.g., applied by the UE) and the actual TA (e.g., applied by the UE to align the DL and UL frame timing at the gNB side). For example, T may be a negative value if the TA applied by the UE is larger than the (actual) TA applied by UE to align the DL and UL frame timing at the gNB side.

In some implementations, the UE may drop the configured UL transmission if the end boundary of the last symbols including the configured UL transmission are within the time duration before the start boundary of the FFPg and if the UE is explicitly indicated that the gNB will initiate the FFPg. The indication may be conveyed via a DCI format 2_0 or via UE-specific DCI.

CP Extension

The following implementations may be applied for configuring the CP extension for a configured UL transmission(s). The implementations may achieve at least the following benefits. For example, the implementations may align the start positions of multiple UEs, which may avoid mutual blocking of the UEs. The implementations may ensure the start boundary of one or more FFPu initiated by a UE is at time position(s) that may be derived by the start position and a periodicity, which may satisfy the rule in regulation of the FBE operation that the UE should not change FFPu more than once every 200 ms.

It should be noted that an RB set may include all the RBs for which a single LBT is required.

In some implementations, for the configured UL transmission which may be used for initiating an FFPu (e.g., CG PUSCH with the start symbol aligned with the start boundary of the FFPu) and (associate) with FDRA on fewer than all the RBs of an RB set, a first parameter (e.g., cg-StartingPartialBW-OutsideCOT) may be used to configure the CP extension for a UE to apply for the configured UL transmission when the configured UL transmission is transmitted based on the FFPu.

In some implementations, for the configured UL transmission which may be used for initiating an FFPu (e.g., CG PUSCH with the start symbol aligned with the start boundary of the FFPu) and (associate) with FDRA on all the RBs of an RB set, the first parameter may be used to configure the CP extension for a UE to apply for the configured UL transmission when the configured UL transmission is transmitted based on the FFPu.

In some implementations, for the configured UL transmission which may be transmitted based on an FFPg (e.g., CG PUSCH with the start symbol not aligned with the start boundary of an FFPu) and (associate) with FDRA on fewer than all the RBs of an RB set, a second parameter (e.g., cg-StartingPartialBW-Inside-gNBCOT) may be used to configure the CP extension for a UE to apply for the configured UL transmission when the configured UL transmission is transmitted based on the FFPg.

In some implementations, for the configured UL transmission which may be transmitted based on an FFPg (e.g., CG PUSCH with the start symbol not aligned with the start boundary of an FFPu) and (associate) with FDRA on all the RBs of an RB set, no CP extension may be applied for the configured UL transmission when the configured UL transmission is transmitted based on the FFPg.

In some implementations, for the configured UL transmission (associated) with FDRA on fewer than all the RBs of an RB set and with the start symbol not aligned with the start boundary of an FFPu that includes the configured UL transmission, a third parameter (e.g., cg-StartingPartialBW-Inside-UECOT) may be used to configure the CP extension for a UE to apply for the configured UL transmission when the configured UL transmission is transmitted based on the FFPu.

In some implementations, for the configured UL transmission (associated) with FDRA on all the RBs of an RB set and with the start symbol not aligned with the start boundary of an FFPu that includes the configured UL transmission, a UE may apply the CP extension configured by the third parameter or apply no CP extension for the configured UL transmission when the configured UL transmission is transmitted based on the FFPu.

In some implementations, for the configured UL transmission (associated) with FDRA on fewer than all the RBs of an RB set, a UE may apply the CP extension configured by the first parameter when the configured UL transmission is transmitted based on an FFPg. In some implementations, a gNB may ensure that the gap created by applying the CP extension configured by the first parameter is equal to or larger than 25 μs.

In some implementations, for the configured UL transmission (associated) with the start symbol not aligned with the start boundary of an FFPu that includes the configured UL transmission, the CP extension configured by the second parameter may not be applied for the configured UL transmission when the configured UL transmission is transmitted based on an FFPg if there is no DL symbols between the last UL transmission and the configured UL transmission in the FFPg.

In some implementations, for the configured UL transmission with the start symbol not aligned with the start boundary of an FFPu that includes the configured UL transmission, the CP extension configured by the third parameter may not be applied for the configured UL transmission when the configured UL transmission is transmitted based on the FFPu if there is no DL symbols between the last UL transmission and the configured UL transmission in the FFPu initiated by the UE.

In some implementations, for the configured UL transmission that may be transmitted based on an FFPg (e.g., CG PUSCH with the start symbol not aligned with the start boundary of an FFPu), a fourth parameter (e.g. cg-StartingPartialBW-Inside-gNBCOTAfterUL) may be used to configure the CP extension for a UE to apply for the configured UL transmission when the configured UL transmission is transmitted based on the FFPg, if there is no DL symbols between the last UL transmission and the configured UL transmission in the FFPg.

In some implementations, for the configured UL transmission with the start symbol not aligned with the start boundary of an FFPu that includes the configured UL transmission, a fifth parameter (e.g. cg-StartingPartialBW-Inside-UECOTAfterUL) may be used to configure the CP extension for a UE to apply for the configured UL transmission when the configured UL transmission is transmitted based on the FFPu, if there is no DL symbols between the last UL transmission and the configured UL transmission in the FFPu initiated by the UE.

FIG. 3 is a flowchart illustrating a method 300 for an FBE operation performed by a UE in an unlicensed band, according to an example implementation of the present disclosure. In action 302, the UE may receive, from a BS, DCI. The DCI may schedule a scheduled PUSCH (e.g., DG PUSCH) and may indicate that an initiator of a CO of an FFP for the scheduled PUSCH is the UE. In action 304, the UE may initiate the CO of the FFP by transmitting a configured PUSCH within the CO of the FFP to the BS after determining that a DL signal has not been detected within a second FFP before a start time of the configured PUSCH. The scheduled PUSCH may be (scheduled) immediately after the configured PUSCH. In action 306, the UE may transmit, to the BS, the scheduled PUSCH within the CO of the FFP after receiving the DCI. The start time of the configured PUSCH may be aligned with a start time of the FFP. An end time of the configured PUSCH may be before a start time of an idle period of the FFP and a start time of an idle period of the second FFP. The second FFP may overlap the FFP and may be used when the BS operates as an initiating device for the FBE operation. That is, the UE may transmit the scheduled PUSCH immediately after the CG PUSCH within the CO of the FFP without performing a CCA within the CO of the FFP initiated by the UE. In other words, the UL transmission burst may be associated with the same CO initiated by the UE.

In some implementations, the end time of the configured PUSCH and a start time of the scheduled PUSCH may be in consecutive symbols.

In some implementations, the UE may determine whether a channel of the unlicensed band is clear by performing a CCA on the channel. The UE may transmit the configured PUSCH on the channel after determining that the channel is clear.

In some implementations, the UE may receive, from the BS, a first parameter indicating a first periodicity and a starting offset of the FFP. The UE may receive, from the BS, a second parameter indicating a second periodicity of the second FFP.

FIG. 4 is a flowchart illustrating a method 400 for an FBE operation in an unlicensed band performed by a BS, according to an example implementation of the present disclosure. In action 402, the BS may set an indication indicating an initiator of a CO of an FFP for a scheduled PUSCH as a UE. In action 404, the BS may transmit, to the UE, DCI scheduling the scheduled PUSCH and including the indication. In action 406, the BS may disable transmitting, to the UE, a DL signal within a second FFP before a start time of a configured PUSCH. In action 408, the BS may receive, from the UE, the configured PUSCH within the CO of the FFP (e.g., after the CO of the FFP is initiated by the UE). In action 410, the BS may receive, from the UE, the scheduled PUSCH within the CO of the FFP after transmitting the DCI, the scheduled PUSCH being (scheduled) immediately after the configured PUSCH. The start time of the configured PUSCH may be aligned with a start time of the FFP. An end time of the configured PUSCH may be before a start time of an idle period of the FFP and a start time of an idle period of the second FFP. The second FFP may overlap the FFP and may be used when the BS operates as an initiating device for the FBE operation.

In some implementations, the end time of the configured PUSCH and a start time of the scheduled PUSCH may be in consecutive symbols.

In some implementations, the BS may transmit, to the UE, a first parameter indicating a first periodicity and a starting offset of the FFP. The BS may transmit, to the UE, a second parameter indicating a second periodicity of the second FFP.

It should be noted that the order in which the process is described is not intended to be construed as a limitation, and any number of the described actions may be combined in any order to implement the method or an alternate method. Moreover, one or more of the actions illustrated in FIGS. 3 through 4 may be omitted in some implementations.

A communication system for the FBE operation in an unlicensed band according to an example implementation of the present disclosure is described as follows. The communication system may include at least a BS and a UE. The BS may (be configured to) set an indication indicating an initiator of a CO of a FFP for a scheduled PUSCH as a UE. The BS may (be configured to) transmit, to the UE, DCI scheduling the scheduled PUSCH and including the indication. The BS may (be configured to) disable transmitting, to the UE, a DL signal within a second FFP before a start time of a configured PUSCH. The UE may (be configured to) initiate the CO of the FFP by transmitting the configured PUSCH within the CO of the FFP to the BS, after determining that the DL signal has not been detected within the second FFP before the start time of the configured PUSCH, the scheduled PUSCH being immediately after the configured PUSCH. The UE may (be configured to) transmit, to the BS, the scheduled PUSCH within the CO of the FFP after receiving the DCI. The start time of the configured PUSCH may be aligned with a start time of the FFP. An end time of the configured PUSCH may be before a start time of an idle period of the FFP and a start time of an idle period of the second FFP. The second FFP may overlap the FFP and may be used when the BS operates as an initiating device for the FBE operation.

In some implementations, the end time of the configured PUSCH and a start time of the scheduled PUSCH may be in consecutive symbols.

In some implementations, the UE may (be configured to) determine whether a channel of the unlicensed band is clear by performing a clear channel assessment (CCA) on the channel. The UE may (be configured to) transmit the configured PUSCH on the channel after determining that the channel is clear.

In some implementations, the BS may (be configured to) transmit, to the UE, a first parameter indicating a first periodicity and a starting offset of the FFP. The BS may (be configured to) transmit, to the UE, a second parameter indicating a second periodicity of the second FFP.

Figure 5:
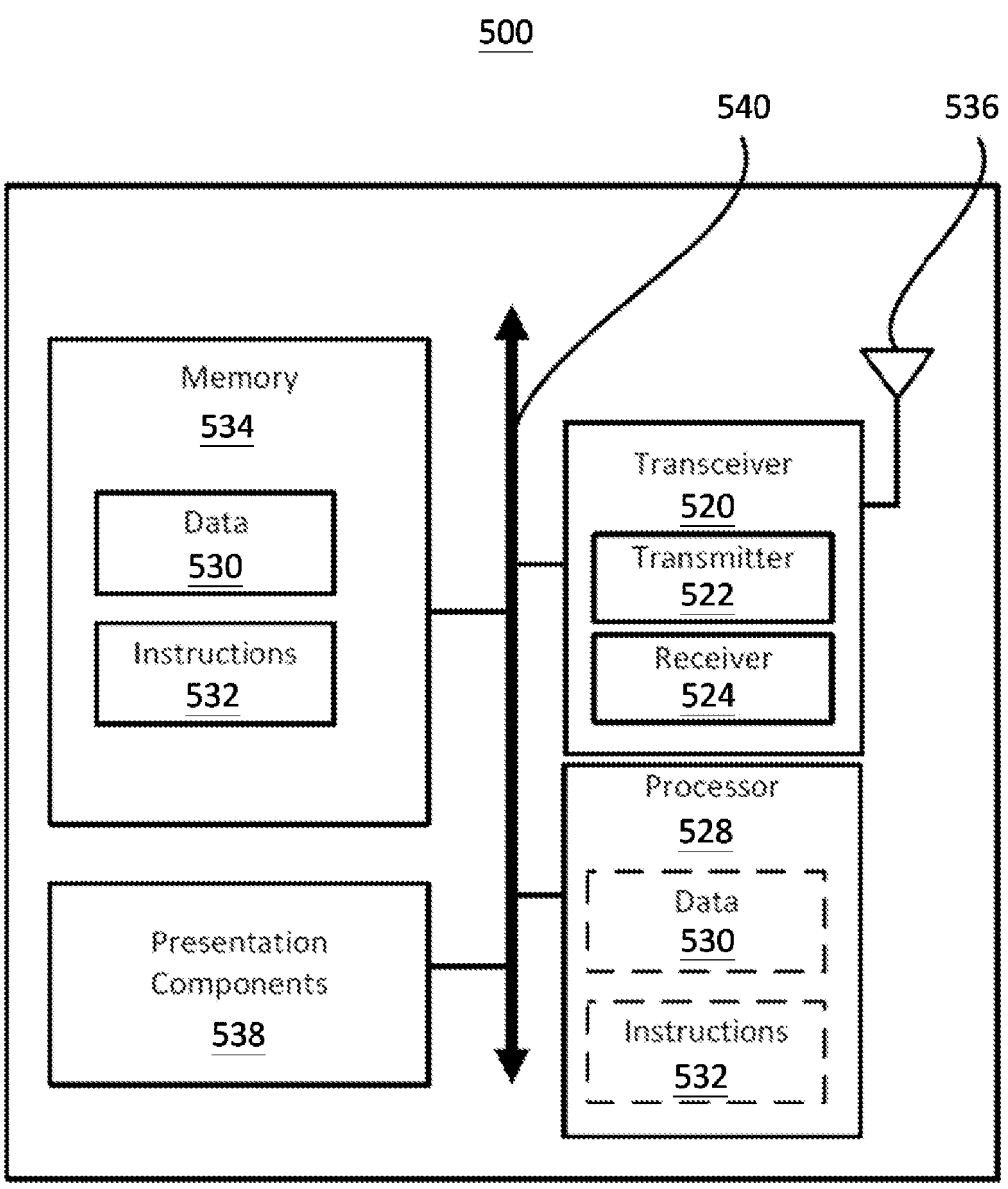
FIG. 5 is a block diagram illustrating a node for wireless communication, according to an example implementation of the present disclosure.

FIG. 5 is a block diagram illustrating a node 500 for wireless communication, according to an example implementation of the present disclosure. As illustrated in FIG. 5, a node 500 may include a transceiver 520, a processor 528, a memory 534, one or more presentation components 538, and at least one antenna 536. The node 500 may also include a RF spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, etc. As illustrated in FIG. 5, the memory 534 may store computer-readable, computer-executable instructions 532 (e.g., software codes) that are configured to cause the processor 528 to perform various disclosed functions, for example, with reference to FIGS. 1 through 4. Alternatively, the instructions 532 may not be directly executable by the processor 528 but be configured to cause the node 500 (e.g., when compiled and executed) to perform various disclosed functions.

The processor 528 (e.g., having processing circuitry) may include an intelligent hardware device, e.g., a Central Processing Unit (CPU), a microcontroller, an ASIC, etc. The processor 528 may include memory. The processor 528 may process data 530 and the instructions 532 received from the memory 534, and information transmitted and received via the transceiver 520, the base band communications module, and/or the network communications module. The processor 528 may also process information to be sent to the transceiver 520 for transmission via the antenna 536 to the network communications module for transmission to a CN.

One or more presentation components 538 present data indications to a person or another device. Examples of presentation components 538 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art will recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for performing, by a user equipment (UE), a frame-based equipment (FBE) operation in an unlicensed band, the method comprising:

receiving, from a base station (BS), downlink control information (DCI) that schedules a physical uplink shared channel (PUSCH) and that indicates that an initiator of a channel occupancy (CO) of a first fixed frame period (FFP) for the scheduled PUSCH is the UE;

initiating the CO of the first FFP by transmitting, to the BS, a configured PUSCH within the CO of the first FFP after determining that a downlink (DL) signal has not been detected within a second FFP before a start time of the configured PUSCH, the scheduled PUSCH being immediately after the configured PUSCH; and transmitting, to the BS, the scheduled PUSCH within the CO of the first FFP after receiving the DCI, wherein:

the start time of the configured PUSCH is aligned with a start time of the first FFP, an end time of the configured PUSCH is before a start time of an idle period of the first FFP and a start time of an idle period of the second FFP, and the second FFP overlaps the first FFP and is used when the BS operates as an initiating device for the FBE operation.

2. The method of claim 1, wherein the end time of the configured PUSCH and a start time of the scheduled PUSCH are in consecutive symbols.

3. The method of claim 1, further comprising:

determining whether a channel of the unlicensed band is clear by performing a clear channel assessment (CCA) on the channel, wherein transmitting the configured PUSCH to the BS comprises transmitting the configured PUSCH on the channel after determining that the channel is clear.

4. The method of claim 1, further comprising:

receiving, from the BS, a first parameter indicating a first periodicity and a starting offset of the first FFP; and receiving, from the BS, a second parameter indicating a second periodicity of the second FFP.

5. A user equipment (UE) for performing a frame-based equipment (FBE) operation in an unlicensed band, the UE comprising:

at least one processor; and at least one non-transitory computer-readable medium coupled to the at least one processor and storing one or more computer-executable instructions that, when executed by the at least one processor, cause the UE to:

receive, from a base station (BS), downlink control information (DCI) that schedules a physical uplink shared channel (PUSCH) and that indicates that an initiator of a channel occupancy (CO) of a first fixed frame period (FFP) for the scheduled PUSCH is the UE;

initiate the CO of the first FFP by transmitting, to the BS, a configured PUSCH within the CO of the first FFP after determining that a downlink (DL) signal has not been detected within a second FFP before a start time of the configured PUSCH, the scheduled PUSCH being immediately after the configured PUSCH; and transmit, to the BS, the scheduled PUSCH within the CO of the first FFP after receiving the DCI, wherein:

the start time of the configured PUSCH is aligned with a start time of the first FFP, an end time of the configured PUSCH is before a start time of an idle period of the first FFP and a start time of an idle period of the second FFP, and the second FFP overlaps the first FFP and is used when the BS operates as an initiating device for the FBE operation.

6. A communication system for a frame-based equipment (FBE) operation in an unlicensed band, the communication system comprising a base station (BS) and a user equipment (UE), wherein:

the BS is configured to:

set an indication indicating an initiator of a channel occupancy (CO) of a first fixed frame period (FFP) for a physical uplink shared channel (PUSCH) is the UE, transmit, to the UE, downlink control information (DCI) to schedule the PUSCH and to indicate the indication, and disable transmitting, to the UE, a downlink (DL) signal within a second FFP before a start time of a configured PUSCH, and the UE is configured to:

initiate the CO of the first FFP by transmitting, to the BS, the configured PUSCH within the CO of the first FFP after determining that the DL signal has not been detected within the second FFP before the start time of the configured PUSCH, the scheduled PUSCH being immediately after the configured PUSCH, and transmit, to the BS, the scheduled PUSCH within the CO of the first FFP after receiving the DCI, wherein:

the start time of the configured PUSCH is aligned with a start time of the first FFP, an end time of the configured PUSCH is before a start time of an idle period of the first FFP and a start time of an idle period of the second FFP, and the second FFP overlaps the first FFP and is used when the BS operates as an initiating device for the FBE operation.

7. The communication system of claim 6, wherein the end time of the configured PUSCH and a start time of the scheduled PUSCH are in consecutive symbols.

8. The communication system of claim 6, wherein the UE is further configured to:

determine whether a channel of the unlicensed band is clear by performing a clear channel assessment (CCA) on the channel, wherein transmitting the configured PUSCH to the BS comprises transmitting the configured PUSCH on the channel after determining that the channel is clear.

9. The communication system of claim 6, wherein the BS is further configured to:

transmit, to the UE, a first parameter indicating a first periodicity and a starting offset of the first FFP, and transmit, to the UE, a second parameter indicating a second periodicity of the second FFP.

\* \* \* \* \*